US012242826B2

(12) United States Patent
Ciminelli et al.

(10) Patent No.: US 12,242,826 B2
(45) Date of Patent: Mar. 4, 2025

(54) LEARNING TO PERSONALIZE USER INTERFACES

(71) Applicants: Nikolas Louis Ciminelli, Buffalo, NY (US); Tom Zeev Jacob Palny, Tel Aviv-Yaffo (IL); Ron Zass, Kiryat Tivon (IL)

(72) Inventors: Nikolas Louis Ciminelli, Buffalo, NY (US); Tom Zeev Jacob Palny, Tel Aviv-Yaffo (IL); Ron Zass, Kiryat Tivon (IL)

( * ) Notice: Subject to any disclaimer, the term of this patent is extended or adjusted under 35 U.S.C. 154(b) by 17 days.

(21) Appl. No.: 18/464,001

(22) Filed: Sep. 8, 2023

(65) Prior Publication Data
US 2023/0418572 A1 Dec. 28, 2023

Related U.S. Application Data

(60) Provisional application No. 63/534,747, filed on Aug. 25, 2023, provisional application No. 63/444,841, (Continued)

(51) Int. Cl.
*G06F 8/38* (2018.01)
*G06F 3/04842* (2022.01)
(Continued)

(52) U.S. Cl.
CPC ............ *G06F 8/38* (2013.01); *G06F 3/04842* (2013.01); *G06F 3/04845* (2013.01);
(Continued)

(58) Field of Classification Search
CPC .... G06F 21/60; G06F 16/9535; G06F 16/901; G06F 3/0484; G06F 16/36; G06F 3/0482; G06F 9/451; G06F 16/33; G06F 16/953; G06F 40/30; G06F 21/00; G06F 3/0481; G06F 16/248; G06F 16/9035; G06F 16/9038; G06F 16/955; G06F 15/16; G06F 16/21; G06F 16/23; G06F 16/2455;
(Continued)

(56) References Cited

U.S. PATENT DOCUMENTS 4,305,131 A 12/1981 Best
6,077,085 A 6/2000 Parry
(Continued)

*Primary Examiner* — Rayeez R Chowdhury

(57) ABSTRACT

Systems, methods and non-transitory computer readable media for learning to personalize user interfaces are provided. A plurality of historic digital experience records may be accessed, each may be associated with an historic digital experience of a respective individual with a respective user interface and may associate a characteristic of the respective individual with a design of the respective user interface and a respective level of success. The plurality of records may be analyzed to determine a mathematical mapping of individuals to a mathematical space. Digital data associated with an individual may be analyzed using the mathematical mapping to identify a mathematical object. The mathematical object may be used to generate a version of a design of a particular user interface. Digital signals may be transmitted to a computing device associated with the individual to cause it to present the particular user interface based on the version of the design.

20 Claims, 11 Drawing Sheets

Related U.S. Application Data filed on Feb. 10, 2023, provisional application No. 63/441,097, filed on Jan. 25, 2023, provisional application No. 63/439,080, filed on Jan. 14, 2023, provisional application No. 63/436,639, filed on Jan. 2, 2023, provisional application No. 63/426,748, filed on Nov. 19, 2022, provisional application No. 63/405,417, filed on Sep. 10, 2022.

(51) Int. Cl.
G06F 3/04845 (2022.01)
G06F 3/04847 (2022.01)
G06F 3/0487 (2013.01)
G06F 8/71 (2018.01)
G06F 9/451 (2018.01)
G06F 40/253 (2020.01)
G06F 40/30 (2020.01)
G06F 40/40 (2020.01)
G06F 40/58 (2020.01)
G06T 11/60 (2006.01)
G06V 30/422 (2022.01)

(52) U.S. Cl.
CPC ........ G06F 3/04847 (2013.01); G06F 3/0487 (2013.01); G06F 8/71 (2013.01); G06F 9/451 (2018.02); G06F 40/253 (2020.01); G06F 40/30 (2020.01); G06F 40/40 (2020.01); G06F 40/58 (2020.01); G06T 11/60 (2013.01); G06V 30/422 (2022.01)

(58) Field of Classification Search
CPC .. G06F 16/2457; G06F 16/332; G06F 16/335; G06F 16/35; G06F 16/951; G06F 16/9538; G06F 18/22; G06F 3/048; G06F 3/04842; G06F 16/583; G06F 17/00
See application file for complete search history.

(56) References Cited

U.S. PATENT DOCUMENTS

| | | |
|---|---|---|
| 6,778,252 B2 | 8/2004 | Moulton et al. |
| 8,140,322 B2 | 3/2012 | Simonsen et al. |
| 9,747,282 B1 | 8/2017 | Baker et al. |
| 9,864,933 B1 | 1/2018 | Cosic |
| 10,423,999 B1 | 9/2019 | Doctor |
| 10,467,792 B1 | 11/2019 | Roche |
| 10,607,134 B1 | 3/2020 | Cosic |
| 11,024,194 B1 | 6/2021 | Beigman Klebanov |
| 11,140,459 B2 | 10/2021 | Ingel |
| 11,159,597 B2 | 10/2021 | Ingel |
| 11,202,131 B2 | 12/2021 | Zass |
| 11,232,645 B1 | 1/2022 | Roche et al. |
| 11,244,385 B1 | 2/2022 | Fraser |
| 11,520,079 B2 | 12/2022 | Zass |
| 11,966,688 B1 | 4/2024 | Ehrlich |
| 2002/0087317 A1 | 7/2002 | Lee et al. |
| 2002/0161578 A1 | 10/2002 | Saindon et al. |
| 2002/0161579 A1 | 10/2002 | Saindon et al. |
| 2004/0068410 A1 | 4/2004 | Mohamed et al. |
| 2004/0172257 A1 | 9/2004 | Liqin et al. |
| 2005/0255431 A1 | 11/2005 | Baker |
| 2005/0272013 A1 | 12/2005 | Knight |
| 2006/0285654 A1 | 12/2006 | Nesvadba et al. |
| 2007/0124166 A1 | 5/2007 | Van Luchene |
| 2007/0208569 A1 | 9/2007 | Subramanian et al. |
| 2007/0220575 A1 | 9/2007 | Cooper et al. |
| 2008/0015968 A1 | 1/2008 | Van Luchene |
| 2008/0195386 A1 | 8/2008 | Proidl |
| 2009/0037179 A1 | 2/2009 | Liu et al. |
| 2009/0175596 A1 | 7/2009 | Hirai |
| 2010/0082326 A1 | 4/2010 | Bangalore |
| 2010/0100907 A1 | 4/2010 | Chang |
| 2010/0238179 A1 | 9/2010 | Kelly |
| 2011/0076992 A1 | 3/2011 | Chou |
| 2012/0054619 A1 | 3/2012 | Spooner et al. |
| 2013/0110513 A1 | 5/2013 | Jhunja et al. |
| 2013/0188862 A1 | 7/2013 | Lievens |
| 2014/0142918 A1 | 5/2014 | Dotterer et al. |
| 2014/0164507 A1 | 6/2014 | Tesch et al. |
| 2014/0303958 A1 | 10/2014 | Lee et al. |
| 2014/0358518 A1 | 12/2014 | Wu et al. |
| 2015/0356967 A1 | 10/2015 | Byron et al. |
| 2015/0319518 A1 | 11/2015 | Wilson |
| 2016/0021334 A1 | 1/2016 | Rossano et al. |
| 2016/0042766 A1 | 2/2016 | Kummer |
| 2016/0132578 A1 | 5/2016 | Allen |
| 2016/0254795 A1 | 9/2016 | Ballard |
| 2016/0328391 A1 | 11/2016 | Choi |
| 2016/0365087 A1 | 12/2016 | Freud |
| 2017/0011745 A1 | 1/2017 | Navaratnam |
| 2017/0075877 A1 | 3/2017 | Lepeltier |
| 2017/0076749 A1 | 3/2017 | Kanevsky |
| 2017/0255616 A1 | 9/2017 | Yun et al. |
| 2018/0174577 A1 | 6/2018 | Jothilingam et al. |
| 2018/0174595 A1 | 6/2018 | Dirac et al. |
| 2018/0253992 A1 | 9/2018 | Koul et al. |
| 2018/0260448 A1 | 9/2018 | Osotio et al. |
| 2018/0322875 A1 | 11/2018 | Adachi |
| 2018/0357215 A1* | 12/2018 | Austin ............... G06F 16/9535 |
| 2018/0374461 A1 | 12/2018 | Serletic |
| 2019/0065478 A1 | 2/2019 | Tsujikawa et al. |
| 2019/0166176 A1 | 5/2019 | Jain et al. |
| 2019/0354592 A1 | 11/2019 | Musham et al. |
| 2020/0007946 A1 | 1/2020 | Olkha |
| 2020/0042601 A1 | 2/2020 | Doggett |
| 2020/0043112 A1 | 2/2020 | Brinkley, II |
| 2020/0058289 A1 | 2/2020 | Gabryjelski et al. |
| 2020/0066304 A1 | 2/2020 | Chen |
| 2020/0105245 A1 | 4/2020 | Gupta |
| 2020/0111474 A1 | 4/2020 | Kumar et al. |
| 2020/0143813 A1 | 5/2020 | Nakagawa |
| 2020/0159862 A1* | 5/2020 | Kleiner ............... G06F 16/248 |
| 2020/0221176 A1 | 7/2020 | Hwang et al. |
| 2020/0311120 A1* | 10/2020 | Zhao .................... G06F 18/23 |
| 2021/0019373 A1 | 1/2021 | Freitag |
| 2021/0063363 A1 | 3/2021 | Kaminski et al. |
| 2021/0081101 A1* | 3/2021 | Speare ................ G06F 3/0482 |
| 2021/0097976 A1 | 4/2021 | Chicote et al. |
| 2021/0264369 A1 | 5/2021 | Zass |
| 2021/0279822 A1 | 5/2021 | Bellaish |
| 2021/0192824 A1 | 6/2021 | Chen |
| 2021/0287150 A1 | 6/2021 | Zass |
| 2021/0224319 A1 | 7/2021 | Ingel |
| 2021/0232759 A1 | 7/2021 | Schick et al. |
| 2021/0400101 A1 | 12/2021 | Ingel |
| 2022/0070550 A1 | 3/2022 | Ingel |
| 2023/0048149 A1 | 2/2023 | Zass |
| 2023/0049015 A1 | 2/2023 | Zass |
| 2023/0052442 A1 | 2/2023 | Zass |
| 2023/0057835 A1 | 2/2023 | Zass |
| 2023/0069088 A1 | 3/2023 | Zass |
| 2023/0252224 A1 | 8/2023 | Tran |
| 2024/0220521 A1 | 7/2024 | Ehrlich |
| 2024/0220714 A1 | 7/2024 | Ehrlich |

\* cited by examiner

210 Memory

| 402 | 404 | 406 | 408 | 410 |

| 502 | 504 | 506 | 508 | 510 | 512 | 514 |

| 602 | 604 | 606 | 608 |

| 702 | 704 | 706 | 708 | 710 | 712 | 714 | 716 | 718 |

| 802 | 804 | 806 | 808 | 810 | 812 | 814 |

| 902 | 904 | 906 | 908 | 910 | 912 | 914 |

| 916 | 918 | 920 |

302 Identifying a mathematical object in a particular mathematical space, the mathematical object corresponds to a specific word 304 Calculating a function of two mathematical objects in a particular mathematical space to obtain a particular mathematical object in the particular mathematical space, the particular mathematical object corresponds to a particular word 306 Identifying a mathematical object based on particular information 308 Presenting a design and/or a user interface

| 402 Receiving a textual input in a natural language and/or a sketch, the textual input and/or the sketch are associated with a desire of an individual to create a new user interface |

| 404 Analyzing the textual input and/or the sketch to obtain at least two user interface elements |

| 406 Analyzing the textual input and/or the sketch to obtain a layout for the at least two user interface elements |

| 408 Generating a particular draft of the new user interface that includes the at least two user interface elements based on the layout |

| 410 Presenting the particular draft of the new user interface to the individual in a form that enables the individual to modify the new user interface |

| 502 Receiving digital data associated with a design of a user interface, the user interface includes a plurality of elements |

↓

| 504 Using the digital data to cause a first presentation of the user interface to an individual, the first presentation is based on the design |

↓

| 506 Receiving from the individual a selection of a portion of the user interface, the selected portion of the user interface includes at least two but not all elements of the plurality of elements |

↓

| 508 Receiving from the individual a textual input in a natural language and/or a sketch, the textual input and/or the sketch are associated with a desire of the individual to modify a portion of the design of the user interface corresponding to the selected portion of the user interface |

↓

| 510 Analyzing the textual input and/or the sketch to determine at least one change to the portion of the design of the user interface |

↓

| 512 Implementing the determined at least one change to generate a modified design of the user interface |

↓

| 514 Causing a second presentation of the user interface to the individual, the second presentation is based on the modified design |

| 702 Receiving digital data associated with a first version of a design of a user interface |

▼

| 704 Using the digital data to cause a first presentation of the user interface to an individual based on the first version of the design |

▼

| 706 Receiving from the individual a first textual input in a natural language and/or a first sketch associated with a desire of the individual to modify the design of the user interface |

▼

| 708 Analyzing the first textual input and/or the first sketch to determine at least one change to the first version of the design of the user interface, the at least one change is associated with a level |

▼

| 710 Implementing the at least one change to generate a second version of the design of the user interface associated with the level |

▼

| 712 Causing a second presentation of the user interface to the individual based on the generated second version of the design |

▼

| 714 Receiving from the individual a second textual input in a natural language and/or a second sketch associated with a desire of the individual to adjust the level |

▼

| 716 Analyzing the second textual input and/or the second sketch to generate a third version of the design of the user interface, the third version is associated with an adjusted level |

▼

| 718 Causing a third presentation of the user interface to the individual based on the generated third version of the design |

802 Receiving from a particular individual a textual input in a natural language and/or a sketch, the textual input and/or the sketch are associated with a desire of the particular individual to affect a design of a user interface

804 Obtaining first digital data associated with a first individual

806 Using the first digital data, the textual input and/or the sketch to generate a first version of the design of the user interface

808 Transmitting first digital signals to a first computing device associated with the first individual, the first digital signals are configured to cause the first computing device to present the user interface based on the first version of the design

810 Obtaining second digital data associated with a second individual, the second digital data differs from the first digital data

812 Using the second digital data, the textual input and/or the sketch to generate a second version of the design of the user interface, the second version differs from the first version

814 Transmitting second digital signals to a second computing device associated with the second individual, the second digital signals are configured to cause the second computing device to present the user interface based on the second version of the design

FIG. 8A

850
Our objective is to accumulate a substantial number of positive reviews for our hotel while minimizing the occurrence of negative reviews.

852
(Number of good reviews, Number of negative reviews)

| 862<br>An individual that tends to write good reviews.<br>Number of good reviews – 52<br>Number of negative reviews - 1 | 872<br>An individual that tends to write negative reviews.<br>Number of good reviews – 2<br>Number of negative reviews – 13 |
| --- | --- |
| 864<br>(52, 1) | 874<br>(2, 13) |
| 866<br>A design of a user interface with a review option in a central location for increasing the number of reviews. | 876<br>A design of a user interface with a review option in a hidden location for decreasing the number of reviews. |

| 902 | Accessing historic digital experience records, each is associated with a digital experience of an individual with a user interface and a level of success |

↓

| 904 | Analyzing the historic digital experience records to determine a mathematical mapping of individuals to a mathematical space |

↓

| 906 | Receiving first digital data associated with a first individual |

↓

| 908 | Analyzing the first digital data using the mathematical mapping to identify a first mathematical object in the mathematical space |

↓

| 910 | Using the first mathematical object to generate a first version of a design of a particular user interface |

↓

| 912 | Transmitting first digital signals to a computing device associated with the first individual, to cause it to present the particular user interface based on the first version of the design |

↓

| 914 | Receiving second digital data associated with a second individual |

↓

| 916 | Analyzing the second digital data using the mathematical mapping to identify a second mathematical object in the mathematical space |

↓

| 918 | Using the second mathematical object to generate a second version of the design of the particular user interface |

↓

| 920 | Transmitting second digital signals to a computing device associated with the second individual, to cause it to present the particular user interface based on the second version of the design |

FIG. 9

LEARNING TO PERSONALIZE USER INTERFACES

CROSS-REFERENCE TO RELATED APPLICATIONS

This application claims the benefit of priority of U.S. Provisional Patent Application No. 63/405,417, filed on Sep. 10, 2022, U.S. Provisional Patent Application No. 63/426,748, filed on Nov. 19, 2022, U.S. Provisional Patent Application No. 63/436,639, filed on Jan. 2, 2023, U.S. Provisional Patent Application No. 63/439,080, filed on Jan. 14, 2023, U.S. Provisional Patent Application No. 63/441,097, filed on Jan. 25, 2023, U.S. Provisional Patent Application No. 63/444,841, filed on Feb. 10, 2023 and U.S. Provisional Patent Application No. 63/534,747, filed on Aug. 25, 2023. The entire contents of all of the above-identified applications are herein incorporated by reference.

BACKGROUND OF THE INVENTION

Technological Field

The disclosed embodiments generally relate to systems and methods for person learning to personalize user interfaces. More particularly, the disclosed embodiments relate to systems and methods for learning to personalize user interfaces using a mathematical mapping.

Background Information

Generation and editing of user interfaces, such as user interfaces of websites, apps or extended reality applications, may require expertise in many different domains, including design principles, programming languages, usability testing, accessibility standards, and user experience psychology. Therefore, in many cases the development of complex user interfaces requires collaboration of cross-functional teams consisting of one or more of designers, front-end and back-end developers, UX/UI specialists, content creators, or domain experts to ensure a cohesive, functional, and user-centered final product. The communication among these team members is crucial to ensure that the design vision is accurately translated into code, the user experience is consistent, and any potential issues or challenges are identified and addressed early in the development process. An alignment problem can arise when different team members have varying interpretations of the design specifications, leading to discrepancies between the intended user interface and the implemented one. This misalignment can result in user dissatisfaction, functional errors, and project delays. Therefore, the process of developing or modifying user interfaces is not only a technical endeavor but also a highly collaborative and iterative journey that necessitates continuous alignment, refinement, and adaptation among multidisciplinary team members. Unfortunately, it's worth noting that due to communication problems between team members, these projects can often face significant challenges and even failure, resulting in subpar user experiences and missed project goals. Therefore, it is desirable to simplify the development and modification of user interfaces. Specifically, automating parts of the process to reduce the dependence on an excessive number of team members can contribute to more efficient and successful projects, minimizing the potential for misalignment and project failures.

Moreover, even when user interfaces are superbly developed, the development process often tends to be lengthy and resource-intensive due to the intricate nature of design, coding, testing, and optimization that are involved. Therefore, only a single final version of a user interface is usually produced, and all users are provided with this single final version. However, this approach can overlook the diverse needs and preferences of users, potentially leading to reduced user satisfaction and engagement. As a result, user interfaces are one of the least personalized aspects of the digital experience, missing opportunities to cater to individual user requirements and limiting the potential for creating truly immersive and tailored interactions. Moreover, to achieve hyper-personalization of user interfaces, where a unique version of the user interface is generated for each user, the ability to instantaneously create these interfaces becomes crucial. Implementing hyper-personalization through manual techniques is therefore impractical due to the sheer complexity and scale of generating and managing individualized user interfaces for a diverse user base. Therefore, the automation of user interface creation becomes imperative to achieve true hyper-personalization, allowing for the efficient and scalable generation of individualized interfaces that cater to diverse user needs and preferences.

SUMMARY OF THE INVENTION

In some examples, systems, methods and non-transitory computer readable media for generation of user interfaces from free text are provided. In some examples, a textual input in a natural language and/or a sketch may be received. The textual input and/or the sketch may be associated with a desire of an individual to create a new user interface. Further, the textual input and/or the sketch may be analyzed to obtain at least two user interface elements. Further, the textual and/or the sketch input may be analyzed to obtain a layout for the at least two user interface elements. Further, a particular draft of the new user interface that includes the at least two user interface elements based on the layout may be generated. Further, the particular draft of the new user interface may be presented to the individual in a form that enables the individual to modify the new user interface.

In some examples, systems, methods and non-transitory computer readable media for editing user interfaces from free text and/or sketches are provided. In some examples, digital data associated with a design of a user interface may be received. The user interface may include a plurality of elements. Further, the digital data may be used to cause a first presentation of the user interface to an individual. The first presentation is based on the design. Further, a selection of a portion of the user interface may be received from the individual. The selected portion of the user interface may include at least two but not all elements of the plurality of elements. Further, a textual input in a natural language and/or a sketch may be received from the individual. The textual input and/or the sketch may be associated with a desire of the individual to modify a portion of the design of the user interface corresponding to the selected portion of the user interface. Further, the textual input and/or the sketch may be analyzed to determine at least one change to the portion of the design of the user interface. Further, the determined at least one change may be implemented to generate a modified design of the user interface. Further, a second presentation of the user interface to the individual may be caused. The second presentation may be based on the modified design.

In some examples, systems, methods and non-transitory computer readable media for selecting layouts for user interfaces using free text and/or sketches are provided. In some examples, an indication of a plurality of visual elements may be received. Further, a textual input in a natural language and/or a sketch may be received. The textual input and/or the sketch may be associated with a desire of an individual to arrange the plurality of visual elements. Further, the textual input and/or the sketch may be analyzed to obtain a layout for the plurality of visual elements. Further, a visual presentation of the plurality of visual elements based on the layout may be generated.

In some examples, systems, methods and non-transitory computer readable media for generating and editing user interfaces via chat and/or sketches are provided. In some examples, digital data associated with a first version of a design of a user interface may be received. The digital data may be used to cause a first presentation of the user interface to an individual. The first presentation may be based on the first version of the design. Further, a first textual input in a natural language and/or a first sketch may be received from an individual. The first textual input and/or the first sketch may be associated with a desire of the individual to modify the design of the user interface. The first textual input and/or the first sketch may be analyzed to determine at least one change to the first version of the design of the user interface. The at least one change may be associated with a level. The determined at least one change may be implemented to generate a second version of the design of the user interface. The second version may be associated with the level. A second presentation of the user interface to the individual may be caused. The second presentation may be based on the generated second version of the design. Further, a second textual input in the natural language and/or a second sketch may be received from the individual. The second textual input and/or the second sketch may be associated with a desire of the individual to adjust the level. The second textual input and/or the second sketch may be analyzed to generate a third version of the design of the user interface. The third version may be associated with an adjusted level. A third presentation of the user interface to the individual may be caused. The third presentation may be based on the generated third version of the design.

In some examples, systems, methods and non-transitory computer readable media for hyper personalization of user interfaces are provided. In some examples, a textual input in a natural language and/or a sketch may be received from a particular individual. The textual input and/or sketch may be associated with a desire of the particular individual to affect a design of a user interface. Further, first digital data associated with a first individual may be obtained. The textual input and/or the sketch and/or the first digital data may be used to generate a first version of the design of the user interface. Further, first digital signals may be transmitted to a first computing device associated with the first individual. The first digital signals may be configured to cause the first computing device to present the user interface based on the first version of the design. Further, second digital data associated with a second individual may be obtained. The second digital data may differ from the first digital data. The textual input and/or the sketch and/or the second digital data may be used to generate a second version of the design of the user interface. The second version may differ from the first version. Further, second digital signals may be transmitted to a second computing device associated with the second individual. The second digital signals may be configured to cause the second computing device to present the user interface based on the second version of the design.

In some examples, systems, methods and non-transitory computer readable media for learning to personalize user interfaces are provided. In some examples, a plurality of historic digital experience records may be accessed. Each historic digital experience record of the plurality of historic digital experience records may be associated with an historic digital experience of a respective individual with a respective user interface and may associate a characteristic of the respective individual with a design of the respective user interface and an indication of a respective level of success. The plurality of historic digital experience records may be analyzed to determine a mathematical mapping of individuals to a mathematical space. First digital data associated with a first individual may be received. The first individual may not be associated with any one of the plurality of historic digital experience records. The first digital data may be analyzed using the mathematical mapping to identify a first mathematical object in the mathematical space. The first mathematical object may be used to generate a first version of a design of a particular user interface. First digital signals may be transmitted to a first computing device associated with the first individual. The first digital signals may be configured to cause the first computing device to present the particular user interface based on the first version of the design of the particular user interface. Further, second digital data associated with a second individual may be received. The second individual may not be associated with any one of the plurality of historic digital experience records. The second digital data may be analyzed using the mathematical mapping to identify a second mathematical object in the mathematical space. The second mathematical object may be used to generate a second version of the design of the particular user interface. Second digital signals may be transmitted to a second computing device associated with the second individual. The second digital signals may be configured to cause the second computing device to present the particular user interface based on the second version of the design of the particular user interface.

BRIEF DESCRIPTION OF DRAWINGS

FIG. 3 is a block diagram illustrating an exemplary embodiment of a memory containing software modules, consistent with some embodiments of the present disclosure.

FIG. 4 is a flowchart of an exemplary method for generation of user interfaces from free text, consistent with some embodiments of the present disclosure.

FIG. 5 is a flowchart of an exemplary method for editing user interfaces from free text, consistent with some embodiments of the present disclosure.

FIG. 7 is a flowchart of an exemplary method for generating and editing user interfaces via chat, consistent with some embodiments of the present disclosure.

FIG. 8A is a flowchart of an exemplary method for hyper personalization of user interfaces, consistent with some embodiments of the present disclosure.

FIG. 8B is a block diagram illustrating hyper-personalization of a user interface, consistent with some embodiments of the present disclosure.

FIG. 9 is a flowchart of an exemplary method for learning to personalize user interfaces, consistent with some embodiments of the present disclosure.

DETAILED DESCRIPTION OF THE INVENTION

Figure 1A:
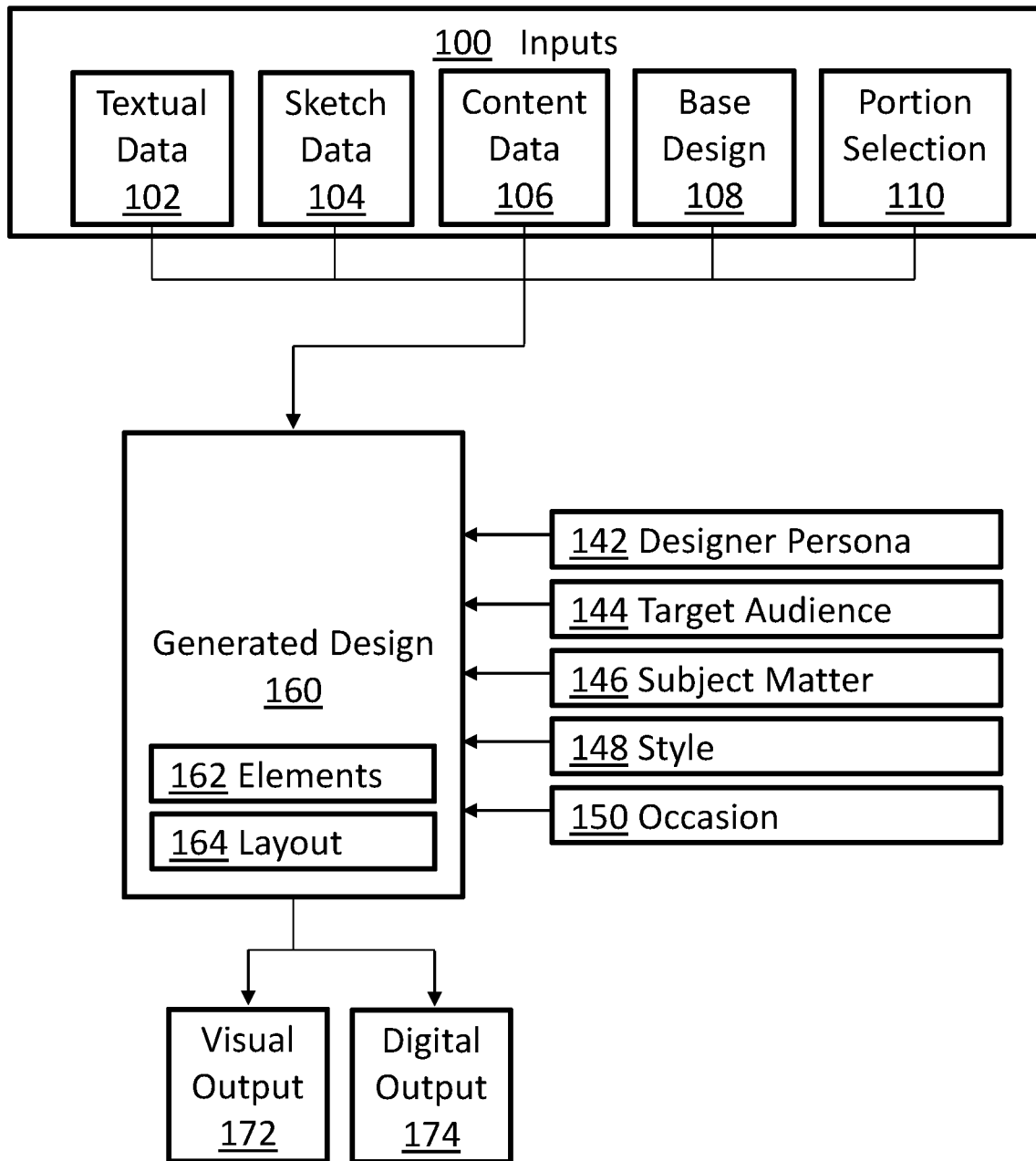
FIG. 1A is a block diagram illustrating some possible flows of information, consistent with some embodiments of the present disclosure.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", "presenting", "causing", "using", "basing", "halting" or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus, the appearance of the phrase "one case", "some cases", "other cases" or variants thereof does not necessarily refer to the same embodiment(s). As used herein, the term "and/or" includes any and all combinations of one or more of the associated listed items.

As used herein, the phrase "may not" means "might not".

Some non-limiting examples, consistent with some embodiments of the present disclosure, of a mathematical object in a mathematical space may include a mathematical point in the mathematical space, a group of mathematical points in the mathematical space (such as a region, a manifold, a mathematical subspace, etc.), a mathematical shape in the mathematical space, a numerical value, a vector, a matrix, a tensor, a function, and so forth. Another non-limiting example of a mathematical object is a vector, wherein the dimension of the vector may be at least two (for example, exactly two, exactly three, more than three, and so forth). Some non-limiting examples, consistent with some embodiments of the present disclosure, of a phrase may include a phrase of at least two words, a phrase of at least three words, a phrase of at least five words, a phrase of more than ten words, and so forth.

In some examples, a user interface consistent with some embodiments of the present disclosure may enable a computerized system to present information to one or more individuals (for example, visually, audibly, textually, graphically, and so forth), may enable one or more individuals to provide information to a computerized system, may enable a computerized system to react to inputs received from one or more individuals (for example, by modifying presented information, by presenting new information, by stopping to present information, and so forth). In a non-limiting example consistent with some embodiments of the present disclosure, a user interface may include a webpage, such as a website that present information to a user, receive inputs from the user, and reacts to the inputs received from the user. In a non-limiting example consistent with some embodiments of the present disclosure, a user interface may be or include a user interface of an app, for example a software app configured to operate with an operating system of a mobile or a stationary device. In a non-limiting example consistent with some embodiments of the present disclosure, a user interface may be or include a user interface configured to operate with at least one of a keyboard, a computer mouse, a touchscreen or a touchpad. For example, the user interface may be configured to receive inputs from a user via at least one of a keyboard, a computer mouse, a touchscreen or a touchpad. In a non-limiting example consistent with some embodiments of the present disclosure, a user interface may be or include a user interface configured for usage in an extended reality environment. For example, the user interface may be configured to present information in the extended reality environment via an extended reality appliance. In one example, the user interface may be configured to receive information from the user via voice commands and/or speech recognition. In one example, the user interface may be configured to receive information from the user via gestures of the user, for example using a gesture recognition algorithm.

In some examples, a design element may be or include a visual element, such as an image, a video, an animation, an illustration, a logo, and so forth. In some examples, a design element may be or include an audio element, such as sequence of sounds, sound effect, music, speech, background music, and so forth. In some examples, a design element may be or include a textual element. In some examples, a design element may be or include at least one font characteristic, such as a typeface, a font size, a text style (such as regular, bold, italic, underline, strikethrough, and so forth), a text position (such as subscript, superscript, default, and so forth), letter spacing, line spacing, a foreground color, a background color, a foreground texture, a background texture, a foreground pattern, a background pattern, and so forth. In some examples, a design element may be or include a user interface element. In some examples, a design element may be or include a color scheme. In some examples, a design element may be or include a background.

In some examples, a user interface element may be an element presenting information and/or enabling a user to enter new information and/or enabling a user to modify information and/or enabling a user to enter selections and/or enabling a user to provide a command and/or enabling a user to initiate a process. Some non-limiting examples of user interface element may include input controls, navigational components, informational components, checkboxes, radio buttons, dropdown lists, list boxes, buttons, dropdown buttons, toggles, text fields, date pickers, time pickers, search fields, breadcrumbs, pagination, tags, sliders, icons, image carousels, notifications, progress bars, tooltips, message boxes, popups, and so forth. In some examples, one user interface element, such as an accordion, may contain a plurality of other user interface elements. In one example, a user interface element may be or include a design element.

In some examples, a design of a user interface may be or include one or more design elements. In some examples, a design of a user interface may be or include a layout for at least part of the elements included in the user interface. In some examples, a design of a user interface may be or include a color scheme of at least part of the user interface. In some examples, a design of a user interface may be or include a density of details in the user interface. In some examples, a design of a user interface may be or include a selection of sizes of at least part of the elements included in the user interface. In some examples, a design of a user interface may be or include a selection of shapes of at least part of the elements included in the user interface. In some examples, a design of a user interface may be or include a selection of font characteristics of at least part of the elements included in the user interface. In some examples, a design of a user interface may be or include a selection of positions for at least part of the elements included in the user interface. In some examples, a design of a user interface may be or include a selection of distances between at least part of the elements included in the user interface.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, one or more stages illustrated in the figures may be executed in a different order and/or one or more groups of stages may be executed simultaneously. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating some possible flows of information consistent with some embodiments of the present disclosure. In this example, inputs 100 may comprise at least one of textual data 102, sketch data 104, content data 106, base design 108 or portion selection 110. In other examples, the inputs 100 may include any other type of information. In one example, inputs 100 may comprise information encoded in a digital format and/or in a digital signal. In some examples, textual data 102 may include any textual information, such as textual content in natural language, source code, formatted text records, textual input, textual files, and so forth. For example, textual data 102 may include an encoding of textual content in digital format, an encoding of textual content in analog format, a hardcopy, and so forth. In some examples, sketch data 104 may include any data corresponding to a visual representation of at least part of a user interface. For example, sketch data 104 may include an encoding of the visual representation in a digital format, an encoding of the visual representation in an analog format, a hardcopy, and so forth. Some non-limiting examples of such visual representation may include a hand-drawn sketch, a digital-drawing, a schematic drawing, a picture, and so forth. In some examples, content data 106 may indicate content for inclusion in the user interface, such as audio content, visual content, sounds, images, videos, animations, texts, slogans, logos, and so forth. For example, content data 106 may include the contents, may include an identifier of the contents (such as file name, identifier in a database, etc.), hardcopies, and so forth. In some examples, base design 108 may include a design of a user interface to be modified, replaced or used as an inspiration. For example, base design 108 may include digital data (such as source code of the base design, for example in as HyperText Markup Language and/or Cascading Style Sheets formats), a visual representation of the base design (such as screenshots of the base design, a sketch of the base design, etc.), a textual description of the visual representation, and so forth. In some examples, portion selection 110 may include an indication of a portion of the base design. For example, the selection of the portion may be received from an individual, for example via a user interface for selecting the portion, via a pointing device (such as a computer mouse, a joystick, a trackpad, a touchpad, etc.), via gestures, via textual description of the portion, and so forth. In another example, the selection of the portion may be received from another automated process, such as an attention mechanism. In one example, selected portion may be received using step 506. In some examples, selected portion 110 may correspond to a convex region of the base design, to a concave region of the base design, to a continuous region of the base design, to a fragmented region of the base design, and so forth. In the example of FIG. 1A, any one of inputs 100, alone or in combination, may be analyzed or otherwise used.

In some examples, an indication of a designer persona, such as designer persona 142, may be obtained. For example, the indication of the designer persona may include or enable access to information related to the designer persona. For example, information related to the designer persona may be read from memory (such as memory 210), may be received from an external computing device (for example, using a digital communication device), may be determined based on an analysis of historic designs (such as historic designs generated by the designer persona, historic designs liked by the designer persona, etc.) associated with the designer persona, may be received from an individual (for example, via a user interface), and so forth. For example, the information related to the designer persona may include at least a portion of historic designs associated with the designer persona, may include an indication of design elements (such as visuals and/or texts and/or layouts and/or colors and/or fonts) associated with the designer persona (for example, design elements commonly used by the designer persona), may include an indication of a style (such as style 148, a drawing style, etc.) associated with the designer persona, may include an indication of layout preferences associated with the designer persona, and so forth. In one example, the designer persona may be selected based on target audience 144 and/or subject matter 146 and/or style 148 and/or occasion 150. For example, a particular designer persona may have previous success making designs related to an occasion or aimed at a target audience, and may be therefore selected.

In some examples, an indication of a target audience, such as target audience 144, may be obtained. For example, the indication of the target audience may include or enable access to information related to the target audience. For example, information related to the target audience may be read from memory (such as memory 210), may be received from an external computing device (for example, using a digital communication device), may be determined based on an analysis of historic designs associated with the target audience, may be received from an individual (for example, via a user interface), and so forth. For example, the information related to the target audience may include at least a portion of historic designs associated with the target audience (for example, historic designs consumed or liked by the target audience, historic designs that drove the target audience to action, etc.), may include an indication of design elements (such as visuals and/or texts and/or layouts and/or colors and/or fonts) associated with the target audience (for example, design elements commonly consumed by the target audience, design elements that drove the target audience to action, etc.), may include an indication of a style (such as style 148,) associated with the target audience, may include an indication of layout preferences associated with the target audience, may include an indication of a location (such as a physical location, a virtual location, a geographical region, a category of locations, etc.) associated with the target audience, may include an indication of a demographic characteristic (such as age, gender, ethnicity, religion, income level, education level, etc.) associated with the target audience, may include an indication of a past actions and/or past events associated with the target audience, may include an indication of behavior patterns associated with the target audience, may include an indication of one or more languages associated with the target audience, and so forth. In one example, a target audience (such as target audience 144) may be a target audience of a single particular individual, may be a target audience of at least two individuals, may be a target audience of at least three individuals, may be a target audience of at least one thousand individuals, may be a target audience of at least one million individuals, and so forth. In some examples, a textual data in a natural language (such as textual data 102, textual data including a description in the natural language of at least one aspect of the target audience, the textual input obtained by step 402, the textual input received by step 508, the textual input received by step 604, the textual input received by step 706, etc.) may be analyzed to determine a characteristic of the target audience, for example using a LLM. In some examples, the information related to the target audience and/or historic activities of individuals associated with the target audience may be analyzed to determine a characteristic of the target audience, for example using a rule based analysis. Some non-limiting examples of such characteristics of the target audience may include susceptibility to styles and/or designs and/or layouts and/or design elements and/or textual messages and/or color schemes and/or fonts, demographic characteristics (such as age group, gender, ethnicity, religion, income level, education level, etc.) associated with the target audience, inclination to taking specific actions, behavior patterns, languages, and so forth.

In some examples, an indication of a subject matter, such as subject matter 146, may be obtained. For example, the indication of the subject matter may include or enable access to information related to the subject matter. For example, information related to the subject matter may be read from memory (such as memory 210), may be received from an external computing device (for example, using a digital communication device), may be determined based on an analysis of historic contents (such as historic textual contents, historic patents, historic visual contents, historic auditory content, historic user interfaces, etc.) associated with the subject matter, may be received from an individual (for example, via a user interface), and so forth. For example, the information related to the subject matter may include at least a portion of historic contents associated with the subject matter, may include an indication of words and/or phrases associated with the subject matter (for example, words and/or phrases commonly used in contents associated with the subject matter), may include an indication of a style (such as style 148, a design style, a drawing style, etc.) corresponding with the subject matter, may include an indication of design elements associated with the subject matter, may include an indication of layouts associated with the subject matter, and so forth. In some examples, image data may be analyzed to determine an indication of the subject matter associated with the generated design. For example, a classification model may be used to classify the image data to a class of a plurality of alternative class, each alternative class may be associated with a subject matter, and thereby the subject matter may be determined from the classification. In some examples, audio data may be analyzed to determine an indication of the subject matter associated with the generated design. For example, a classification model may be used to classify the audio data to a class of a plurality of alternative class, each alternative class may be associated with a subject matter, and thereby the subject matter may be determined from the classification. In one example, the subject matter may be determined based on occasion 150.

In some examples, an indication of a style, such as style 148, may be obtained. For example, the indication of the style may include or enable access to information related to the style. For example, information related to the style may be read from memory (such as memory 210), may be received from an external computing device (for example, using a digital communication device), may be determined based on an analysis of selected historic designs, may be received from an individual (for example, via a user interface), and so forth. For example, style 148 may be a design style, may be a drawing style, and so forth. In one example, style 148 may be a design style of a designer persona (such as designer persona 142), may be a design style selected by an individual, may be a design style that is associated with a subject matter (such as subject matter 146), may be a design style that a target audience (such as target audience 144) is susceptible to, and so forth. In one example, the information related to the style may include an indication of a level of details, may include an indication of an affinity to specific design elements, may include an indication of an affinity to specific layouts, may include an indication of an affinity to specific element sizes, may include an indication of an affinity to specific color schemes, may include an indication of an affinity to specific fonts, may include an indication of an affinity to specific textual messages, may include an indication of an affinity to specific distance between elements, and so forth. In some examples, textual data in a natural language (such as textual data 102, textual data including a description in the natural language of at least one aspect of the style, the textual input obtained by step 402, the textual input received by step 508, the textual input received by step 604, the textual input received by step 706, etc.) may be analyzed to determine the style (or the information related to the style), for example using a LLM. In some examples, an indication of the style may be received from an individual, for example via a user interface. In some examples, at least one other user interface may be analyzed to determine the style (or the information related to the style), for example using a rule based analysis. In one example, the at least one other user interface may be at least one user interface associated with an individual (such as the individual of step 402 and/or step 604). In one example, the at least one other user interface may be at least one user interface associated with a specific designer (such as designer persona 142). In one example, the at least one other user interface may be at least one user interface associated with a specific brand (such as one or more websites associated with the specific brand). In one example, the at least one other user interface may be at least one user interface associated with a specific subject matter (such as subject matter 146).

In some examples, an indication of an occasion, such as occasion 150, may be obtained. For example, the indication of the occasion may include or enable access to information related to the occasion. For example, information related to the occasion may be read from memory (such as memory 210), may be received from an external computing device (for example, using a digital communication device), may be determined based on an analysis of textual data, may be determined based on an analysis of visual data, may be determined based on an analysis of audible data, may be received from an individual (for example, via a user interface), and so forth. Some non-limiting examples of such occasion may include a personal celebration (such as birthday, wedding, anniversary, personal milestone, retirement party, funeral, graduation, etc.), an institutional ceremony, a holiday, a special event, a conference, a seasonal event, a gathering, a sport event, a cultural event, and so forth. In some examples, textual data in a natural language (such as textual data 102, textual data including a description in the natural language of at least one aspect of the style, the textual input obtained by step 402, the textual input received by step 604, etc.) may be analyzed to determine the occasion (or information related to the occasion), for example using a LLM. In one example, the occasion may be determined based on a date, for example using a calendar.

In the example of FIG. 1A, any input of inputs 110, alone or in combination with other inputs and/or information, may be used to generate designs (for example as described herein), and thereby obtaining generated a design (such as design 160). In some examples, the generation of a design (such as design 160) may be further based on at least one of designer persona 142, target audience 144, subject matter 146, or style 148. In one example, a design (such as design 160) may be generated in a style associated with designer persona 142, may include design elements associated with designer persona 142, may include a layout based on the layout preferences associated with the designer persona 142, and so forth. In one example, a design (such as design 160) may be generated in a style associated with target audience 144, may include design elements associated with target audience 144, may include a layout based on the layout preferences associated with the target audience 144, and so forth. In one example, a design (such as design 160) may be generated in a style associated with subject matter 146, may include design elements associated with subject matter 146, may include a layout based on the layouts associated with the subject matter 146, and so forth. In some examples, a design (such as design 160) may be generated in a particular style, for example in style 148. For example, in a particular style selected by an individual, in a particular style associated with a designer persona (such as designer persona 142), in a particular style associated with a target audience (such as target audience 144), in a particular style associated with a specific subject matter (such as subject matter 146), in a particular style selected based on input data, and so forth. For example, a style may include at least one of an affinity to usage of specific design elements, an affinity to specific layout preferences, an affinity to usage of specific visuals, an affinity to usage of specific colors, an affinity to usage of specific shapes, an affinity to usage of specific fonts, an affinity to setting specific size to specific design elements, and so forth. In one example, a particular generative model associated with the particular style may be selected of a plurality of alternative generative models, and a design (such as design 160) may be generated using the particular generative model, thereby generating the design in the particular style. In another example, information associated with the particular style may be used as input to a generative model to cause the generative model to generate a design (such as design 160) in the particular style.

In the example of FIG. 1A, one or more outputs may be provided based on generated design 160. For example, the one or more outputs may include at least one of visual output 172 based on at least part of the generated design 160, or digital output 174 encoding at least part of generated design 160. In one example, digital output 174 may include digital files encoding at least part of generated design 160, for example in HyperText Markup Language (HTML) and/or Cascading Style Sheets (CSS) formats. For example, the digital files may be stored in memory (such as memory unit 110), may be stored in remote storage 188, may be stored in Network Attached Storage 190, and so forth. In one example, digital output 174 may include transmission of digital signals encoding at least part of generated design 160, for example in HTML and/or CSS formats. For example, the digital signals may be transmitted to another computing device using communication module 230. In some examples, generated design 160 may be a design of a user interface. In some examples, generated design 160 may be a design for a visual presentation of information. In some examples, generated design 160 may include elements 162, such as visual elements (such as images, videos, animations, illustrations, logos, etc.), audio elements (such as sequence of sounds, sound effect, music, speech, background music, etc.), design elements, user interface elements, and so forth. In some examples, generated design 160 may include layout 164. In one example, layout 164 may specify locations for elements 162 in the generated design (for example, locations for user interface elements in a user interface, locations for visual elements in a visual presentation, etc.). In one example, layout 164 may specify sizes for elements 162 in the generated design. In one example, layout 164 may specify, when two or more elements of elements 162 overlaps, which one of the two or more elements to favor. In other example, elements 162 may be separated from design 160, and/or design 160 may include layout 164 without any specific element).

Figure 1B:
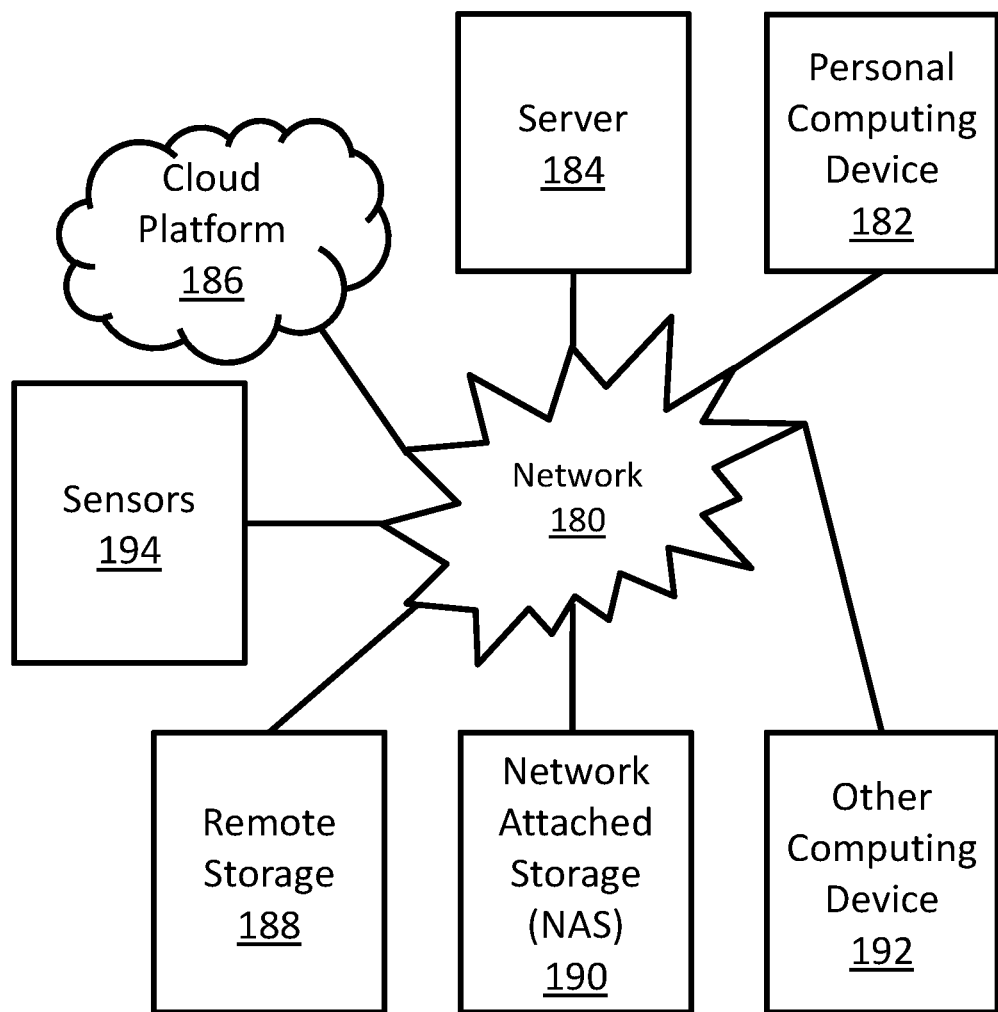
FIG. 1B is a block diagram illustrating a possible implementation of a communicating system, consistent with some embodiments of the present disclosure.

FIG. 1B is a block diagram illustrating a possible implementation of a communicating system consistent with some embodiments of the present disclosure. In this example, apparatuses may communicate using communication network 180 or directly with each other. Some non-limiting examples of such apparatuses may include at least one of personal computing device 182 (such as a mobile phone, smartphone, tablet, personal computer, smartwatch, etc.), server 184, cloud platform 186, remote storage 188 and network attached storage (NAS) 190, other computing devices 192, or sensors 194. Some non-limiting examples of communication network 180 may include digital communication network, analog communication network, the Internet, phone networks, cellular networks, satellite communication networks, private communication networks, virtual private networks (VPN), and so forth. FIG. 1B illustrates a possible implementations of a communication system. In some embodiments, other communication systems that enable communication between apparatuses may be used. Some non-limiting examples of sensors 194 may include at least one of a remote sensor, a sensor integrated in a computing device, image sensors (such as image sensor 260), audio sensors (such as audio sensors 250), motion sensors (such as motion sensor 270), positioning sensors (such as positioning sensors 275), touch sensors, proximity sensors, chemical sensors, temperature sensors, barometers, and so forth.

Figure 2A:
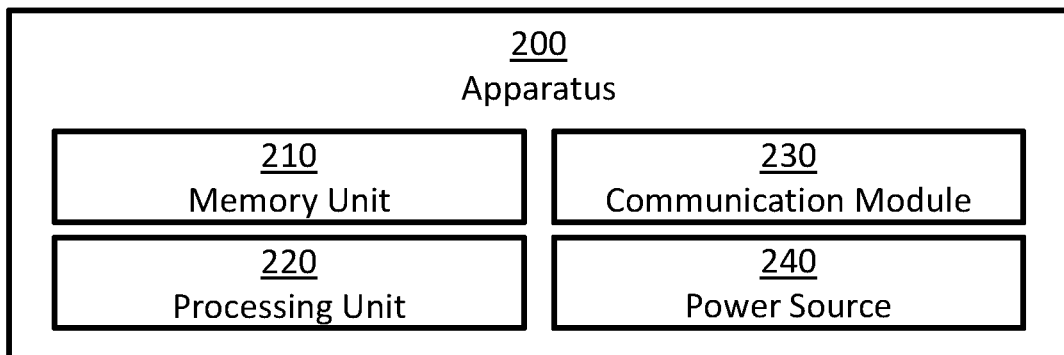
FIGS. 2A and 2B are block diagrams illustrating some possible implementations of an apparatus, consistent with some embodiments of the present disclosure.
Figure 2B:
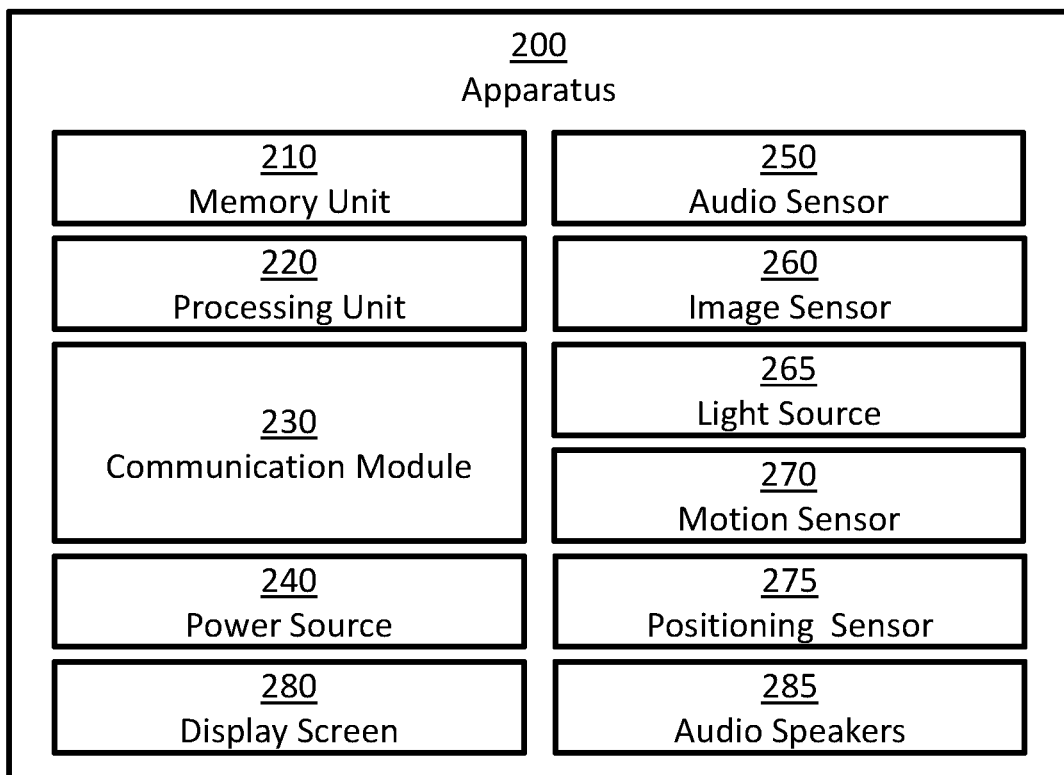

FIG. 2A is a block diagram illustrating a possible implementation of apparatus 200. In this example, apparatus 200 may comprise: one or more memory units 210, one or more processing units 220, and one or more image sensors 260. In some implementations, apparatus 200 may comprise additional components, while some components listed above may be excluded. FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275. In some embodiments, apparatus 200 may be included and/or may be used as a personal computing device (such as personal computing device 182), a personal computer, a tablet, a mobile phone, a smartphone, a smartwatch, a computing device, a wearable computing device, a head-mounted computing device, a server (such as server 184), a computational node of a cloud platform (for example, of cloud platform 186), a router, a remote storage unit (such as remote storage 188), NAS (such as NAS 190), a sensor (such as sensors 194), and so forth.

In some embodiments, one or more power sources 240 may be configured to power apparatus 200. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; 3D images; sequence of 3D images; 3D videos; and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units

220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

FIG. 3 is a block diagram illustrating an exemplary embodiment of a memory 210 containing software modules. In this example, memory 210 contains software modules 302, 304, 306, 308, 402, 404, 406, 408, 410, 502, 504, 506, 508, 510, 512, 514, 602, 604, 606, 608, 702, 704, 706, 708, 710, 712, 714, 716, 718, 802, 804, 806, 808, 810, 812, 814, 902, 904, 906, 908, 910, 912, 914, 916, 918 and 920. In other examples, memory 210 may contain additional modules or fewer modules. The modules are described in more details below. In one example, at least one of these modules may include data and/or computer implementable instructions that when executed by at least one processor (such as processing units 220) may cause the at least one processor to perform operations for carrying out actions corresponding to at least one of these modules. Any one of these modules may be executed alone or in combination with other modules. In particular, any one of these modules may be used as a step in a method, for example as described below. Further, any step in the methods described below may be used independently of the method as a module. It is understood that herein any reference to a step may equally refer to a module and vice versa. In one example, a system may comprise at least one processing unit (such as processing units 220) configured to perform operations for carrying out actions corresponding to at least one of these modules.

In some examples, module 302 may comprise identifying a mathematical object in a particular mathematical space. The mathematical object may correspond to a specific word. In one example, the mathematical object may be determined based on the specific word. For example, a function or an injective function mapping words to mathematical object in the particular mathematical space may be used based on the specific word to obtain the mathematical object corresponding to the specific word. For example, a word2vec or a Global Vectors for Word Representation (GloVe) algorithm may be used to obtain the function. In another example, a word embedding algorithm may be used to obtain the function.

In some examples, module 304 may comprise calculating a function of two mathematical objects in a particular mathematical space to obtain a particular mathematical object in the particular mathematical space. In one example, module 304 may comprise calculating a function of a plurality of mathematical objects (such as two mathematical objects, three mathematical objects, four mathematical objects, more than four mathematical objects, etc.) in a particular mathematical space to obtain a particular mathematical object in the particular mathematical space. In one example, module 304 may comprise calculating a function of at least one mathematical object (such as a single mathematical object, two mathematical objects, three mathematical objects, four mathematical objects, more than four mathematical objects, etc.) in a particular mathematical space and/or at least one numerical value (such as a single numerical value, two numerical values, three numerical values, four numerical values, more than four numerical values, etc.) to obtain a particular mathematical object in the particular mathematical space. Some non-limiting examples of such function may include a linear function, a non-linear function, a polynomial function, an exponential function, a logarithmic function, a continuous function, a discontinuous function, and so forth. In one example, the particular mathematical object may correspond to a particular word. In one example, the particular word may be determined based on the particular mathematical object. For example, the injective function described in relation to module 302 may be used to determine the particular word corresponding to the particular mathematical object.

In some examples, module 306 may comprise identifying a mathematical object based on particular information. For example, the particular information may be or include a word, and module 306 may use module 302 to identify the mathematical object based on the word. In another example, the particular information may be or include the mathematical object, and module 306 may simply access the particular information to obtain the mathematical object. In yet another example, the particular information may be or include a numerical value, and module 306 may calculate a function of the numerical value to obtain the mathematical object. Some non-limiting examples of such function may include a linear function, a non-linear function, a polynomial function, an exponential function, a logarithmic function, a continuous function, a discontinuous function, and so forth. In some examples, the particular information may be or include at least one sentence in a natural language, and module 306 may use a text embedding algorithm to obtain the mathematical object. In some examples, module 306 may use a machine learning model to analyze the particular information to determine the mathematical object. The machine learning model may be a machine learning model trained using training examples to determine mathematical objects based on information. An example of such training example may include sample information, together with a label indicative of a mathematical object.

In some examples, module 308 may comprise presenting a user interface (such as a user interface including elements 162, the draft of the user interface generated by step 408, the user interface of method 500, a user interface including the elements of step 602, the user interface of method 700, the user interface of method 800, the user interface of method 900, etc.). In one example, module 308 may present the user interface based on a design (for example, a user interface based on design 160, the user interface of method 500 based on the design of step 502, the user interface of method 500 based on the modified design of step 512, the user interface of method 700 based on the first version of the design of step 702, the user interface of method 700 based on the second version of the design generated by step 710, the user interface of method 700 based on the third version of the design generated by step 716, the user interface of method 800 based on the first version of the design generated by step 806, the user interface of method 800 based on the second version of the design generated by step 812, the user interface of method 900 based on the first version of the design generated by step 910, the user interface of method 900 based on the second version of the design generated by step 918, and so forth). In one example, module 308 may present the user interface based on a layout (for example, a user interface including elements 162 based on layout 164, a user interface including the elements of step 602 based on the layout obtained by step 606, etc.). In one example, module 308 may present the user interface to an individual (such as the individuals described herein). For example, module 308 may present the user interface in a form that enables the individual to modify the user interface and/or the design and/or the layout. For example, module 308 may present the draft of the interface with another user interface that enables the individual to modify the user interface (for example, in a user-interface design tool). In one example, module 308 may present the user interface using at least one of a display screen or a touch screen. In one example, module 308 may present the user interface in an extended reality environment using an extended reality appliance. In one example, the user interface and/or the elements and/or the layout and/or the design may be encoded in digital files (for example in an HTML format and/or a CSS format and/or a source code in a style sheet language and/or media files), and module 308 may cause the visual presentation using a viewer software (such as a web browser). For example, module 308 may transmit digital signals based on the digital files to cause the visual presentation. In some examples, module 308 may present the user interface in three-dimensional, for example in an extended reality environment, for example via an extended reality appliance. In some examples, module 308 may use digital data (such as the digital data received by step 502, the digital data received by step 702, etc.) to present the user interface. For example, the digital may encode at least part of the layout and/or elements of the user interface (for example in an HTML format and/or a CSS format and/or a source code in a style sheet language and/or media formats). In some examples, the presentation of the user interface by module 308 may include a visual presentation of the user interface and a source code associated with the user interface. In some examples, the presentation of the user interface to the individual by module 308 may enable the individual to select one or more portions of the user interface, for example as described below in relation to step 504 and/or step 506. In some examples, module 308 may use step 410 and/or step 504 and/or step 514 and/or step 608 and/or step 704 and/or step 712 and/or step 718 and/or step 808 and/or step 814 and/or step 912 and/or step 920 to generate the presentation of the user interface.

In some embodiments, a method (such as methods 400, 500, 600, 700, 800 and 900) may comprise of one or more steps. In some examples, these methods, as well as all individual steps therein, may be performed by various aspects of apparatus 200, of a computerized device, and so forth. For example, a system comprising of at least one processor, such as processing units 220, may perform any of these methods as well as all individual steps therein, for example by processing units 220 executing software instructions stored within memory units 210 to perform operations corresponding to the steps. In some examples, these methods, as well as all individual steps therein, may be performed by a dedicated hardware. In some examples, computer readable medium, such as a non-transitory computer readable medium, may store data and/or computer implementable instructions that when executed by at least one processor causes the at least one processor to perform operations for carrying out at least one of these methods as well as all individual steps therein and/or at least one of these steps. In some examples, a system may comprise at least one processing unit (such as processing units 220) configured to perform operations for carrying out at least one of these methods as well as all individual steps therein and/or at least one of these steps. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external computing device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, generative models may be configured to generate new content, such as textual content, visual content, auditory content, graphical content, layouts, and so forth. In some examples, generative models may generate new content without input. In other examples, generative models may generate new content based on an input. In one example, the new content may be fully determined from the input, where every usage of the generative model with the same input will produce the same new content. In another example, the new content may be associated with the input but not fully determined from the input, where every usage of the generative model with the same input may product a different new content that is associated with the input. In some examples, a generative model may be a result of training a machine learning generative algorithm with training examples. An example of such training example may include a sample input, together with a sample content associated with the sample input. Some non-limiting examples of such generative models may include Deep Generative Model (DGM), Generative Adversarial Network model (GAN), auto-regressive model, Variational AutoEncoder (VAE), transformers based generative model, artificial neural networks based generative model, hard-coded generative model, and so forth.

A Large Language Model (LLM) is a generative language model with a large number of parameters (usually billions or more) trained on large corpus of unlabeled data (usually trillions of words or more) in a self-supervised learning scheme and/or a semi-supervised learning scheme. While models trained using a supervised learning scheme with label data are fitted to the specific tasks they were trained for, LLM can handle a wide range of tasks that the model was never specifically trained for, including ill-defined tasks. It is common to provide LLM with instructions in natural language, sometimes referred to as prompts. For example, to cause a LLM to count the number of people that objected to a proposed plan in a meeting, one might use the following prompt, 'Please read the meeting minutes. Of all the speakers in the meeting, please identify those who objected to the plan proposed by Mr. Smith at the beginning of the meeting. Please list their names, and count them.' Further, after receiving a response from the LLM, it is common to refine the task or to provide subsequent tasks in natural language.

For example, 'Also count for each of these speakers the number of words said', 'Of these speakers, could you please identify who is the leader?' or 'Please summarize the main objections'. LLM may generate textual outputs in natural language, or in a desired structured format, such as a table or a formal language (such as a programming language, a digital file format, and so forth). In many cases, a LLM may be part of a multimodal large model, allowing the model to analyze both textual inputs as well as other kind of inputs (such as images, videos, audio, sensor data, telemetries, and so forth) and/or to generate both textual outputs as well as other kinds of outputs (such as images, videos, audio, telemetries, and so forth).

Some non-limiting examples of image data may include one or more images, grayscale images, color images, series of images, 2D images, 3D images, videos, 2D videos, 3D videos, frames, footages, or data derived from other image data. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

FIG. 4 is a flowchart of an exemplary method 400 for generation of user interfaces from free text, consistent with some embodiments of the present disclosure. In this example, method 400 may comprise receiving a textual input in a natural language and/or a sketch, the textual input and/or the sketch are associated with a desire of an individual to create a new user interface (step 402); analyzing the textual input and/or the sketch to obtain at least two user interface elements (step 404); analyzing the textual input and/or the sketch to obtain a layout for the at least two user interface elements (step 406); generating a particular draft of the new user interface that includes the at least two user interface elements based on the layout (step 408); and presenting the particular draft of the new user interface to the individual in a form that enables the individual to modify the new user interface (step 410). In other examples, method 400 may include additional steps or fewer steps. In other examples, one or more steps of method 400 may be executed in a different order and/or one or more groups of steps may be executed simultaneously.

In some examples, step 402 may comprise receiving a textual input in a natural language and/or a sketch. The textual input and/or the sketch may be associated with a desire of an individual to create a new user interface. One non-limiting example of the textual input received by step 402 and/or step 508 and/or step 604 and/or step 706 and/or step 714 and/or step 802 may be textual data 102. One non-limiting example of the sketch received by step 402 and/or step 508 and/or step 604 and/or step 706 and/or step 714 and/or step 802 may be sketch data 104. In one example, receiving a textual input and/or the sketch by step 402 and/or step 508 and/or step 604 and/or step 706 and/or step 714 and/or step 802 may comprise reading the textual input and/or the sketch from memory, may comprise receiving the textual input and/or the sketch from an external device (for example, using digital communication device), may comprise receiving the textual input and/or the sketch from the individual (for example, via a user interface, via a keyboard, via a pointing device, via a touchpad, via a touch screen, via speech recognition, via gestures, and so forth), may comprise generating the textual input and/or the sketch based on data (for example, generating the sketch based on the textual input, generating the textual input based on the sketch, generating the textual input and/or the sketch based on other inputs, using a generative model, and so forth), and so forth. In some examples, the textual input received by step 402 and/or step 508 and/or step 604 and/or step 706 and/or step 714 and/or step 802 may include at least one of (at least two of, at least three of, at least four of, at least five of, at least six of, at least seven of, or all of) a noun, a verb, a proposition, a pronoun, an adverb, an adjective, a conjunction or an interjection.

In some examples, step 404 may comprise analyzing a textual input (such as textual input, the textual input received by step 402, the textual input received by step 802, textual data 102, etc.) and/or a sketch (such as the sketch received by step 402, the sketch received by step 802, sketch data 104, etc.) to obtain user interface elements (for example, a single user interface element, at least two user interface elements, at least ten user interface elements, and so forth). In one example, step 404 may comprise analyzing the textual input and/or the sketch to select the user interface elements of a group of alternative user interface elements. In one example, step 404 may comprise analyzing the textual input and/or the sketch to generate the user interface elements, for example using a generative model. In one example, step 404 may comprise using a machine learning model (such as a unimodal machine learning model, a multimodal machine learning model, a generative model, etc.) to analyze the textual input and/or the sketch and/or additional information and obtain the at least two user interface elements. The machine learning model may be a machine learning model trained using training examples to generate user interface elements and/or to select user interface elements of a plurality of alternatives based on textual information and/or visual information and/or additional information. An example of such training example may include a sample textual input and/or a sample sketch and/or sample additional information, together with a label indicative of a sample selection of sample user interface elements of a sample plurality of alternatives and/or of sample user interface elements. In one example, at least part of the at least two user interface elements obtained by step 404 (for example, exactly one of the at least two user interface elements, more than one of the at least two user interface elements, etc.) may be based on a characteristic of the individual of step 402. For example, step 404 may use the machine learning model with the characteristic of the individual as the additional information. Some non-limiting examples of such characteristics of the individual may include a design style associated with the individual, demographic of the individual, geographical location associated with the individual, an indication of a preference of the individual, past actions and/or behavior of the individual, and so forth. In one example, at least part of the at least two user interface elements obtained by step 404 (for example, exactly one of the at least two user interface elements, more than one of the at least two user interface elements, etc.) may be based on a characteristic of a target audience (for example, on a characteristic of target audience 144). For example, step 404 may use the machine learning model with the characteristic of the target audience as the additional information. In one example, at least part of the at least two user interface elements obtained by step 404 (for example, exactly one of the at least two user interface elements, more than one of the at least two user interface elements, etc.) may be based on a particular design style (such as style 148). For example, the at least part of the at least two user interface elements may be in the particular design style. In another example, step 404 may use the machine learning model with an indication of the particular design style as the additional information. In some examples, the textual input may be indicative of an occasion, and at least part of the at least two user interface elements may be based on the occasion. For example, step 404 may use the machine learning model with an indication of the occasion as the additional information. In some examples, at least part of the at least two user interface elements may be based on a time of year. For example, the time of year may be autumn, and the at least part of the at least two user interface elements may be depiction of falling leaves. In one example, the textual input may be indicative of the time of year.

In some examples, step 404 may identify a first mathematical object in a mathematical space, wherein the first mathematical object may correspond to a first word of the textual input, for example using module 302. Further, step 404 may identify a second mathematical object in the mathematical space, wherein the second mathematical object may correspond to a second word of the textual input, for example using module 302. Further, step 404 may calculate a function of the first mathematical object and the second mathematical object to obtain a third mathematical object in the mathematical space, for example using module 304. Further, step 404 may obtain the at least two user interface elements based on the third mathematical object. For example, step 404 may use a function of the third mathematical object as a random seed or an input of a generative model for generating the at least two user interface elements.

In some examples, the user interface elements obtained by step 404 may include at least one input element designed to enable future users of the new user interface to provide information. Some non-limiting examples of such input elements may include checkboxes, radio buttons, dropdown lists, list boxes, buttons, toggles, input text fields, date pickers, time pickers, search fields, breadcrumbs, and so forth. In one example, such input elements may enable the future users of the new user interface to provide information via at least one of a keyboard, a pointing device, a touchscreen, a voice command, or gesture recognition. In some examples, the at least one input element may be designed to enable the future users of the new user interface to select an option of a plurality of alternatives (for example, a plurality of numerical alternatives, a plurality of numerical ranges, a plurality of images, a plurality of named objects, and so forth), and step 404 may further comprise analyzing the textual input and/or the sketch to determine at least one alternative of the plurality of alternatives. For example, step 404 may use a machine learning model to analyze the textual input and/or the sketch to determine the at least one alternative. The machine learning model may be a machine learning model trained using training example to select and/or generate alternatives based on textual data and/or sketches. An example of such training example may include a sample textual input and/or a sample sketch, together with a label indicative of one or more sample alternatives. In some examples, step 404 may identify a first mathematical object in a mathematical space, wherein the first mathematical object may correspond to a first word of the textual input, for example using module 302. Further, step 404 may identify a second mathematical object in the mathematical space, wherein the second mathematical object may correspond to a second word of the textual input, for example using module 302. Further, step 404 may calculate a function of the first mathematical object and the second mathematical object to obtain a third mathematical object in the mathematical space, for example using module 304. Further, step 404 may base the determination of the at least one alternative on the third mathematical object. For example, the at least one alternative may be a mathematical function the third mathematical object.

In some examples, the user interface elements obtained by step 404 may include at least one image, and step 404 may further comprise analyzing the textual input and/or the sketch to determine the at least one image. The at least one image may differ from the sketch. For example, step 404 may select, based on the textual input and/or the sketch, the at least one image of a plurality of alternative images. For example, step 404 may select the image most similar to a selected portion of the sketch of the plurality of alternative images. In another example, For example, step 404 may select the image compatible with a description included in the textual input of the plurality of alternative images. In some examples, step 404 may use a machine learning model to analyze the textual input and/or the sketch to generate the at least one image. The machine learning model may be a machine learning model trained using training examples to generate images based on texts and/or sketches. An example of such training example may include a sample textual input and/or a sample sketch, together with a sample image. In some examples, step 404 may identify a first mathematical object in a mathematical space, wherein the first mathematical object may correspond to a first word of the textual input, for example using module 302. Further, step 404 may identify a second mathematical object in the mathematical space, wherein the second mathematical object may correspond to a second word of the textual input, for example using module 302. Further, step 404 may calculate a function of the first mathematical object and the second mathematical object to obtain a third mathematical object in the mathematical space, for example using module 304. Further, step 404 may generate the at least one image based on the third mathematical object. For example, step 404 may use a function of the third mathematical object as a random seed or an input of a generative model for generating the at least one image.

In some examples, the user interface elements obtained by step 404 may include at least one textual element. The at least one textual element may include at least one word not included in the textual input. In one example, the at least one textual element may be in a second natural language different from the natural language of step 402. In one example, the at least one textual element may be in the natural language of step 402. In one example, the at least one textual element may be a single word, a single phrase, at least two words, at least five words, at least two sentences, and so forth. Further, step 404 may comprise analyzing the textual input and/or the sketch to generate the at least one textual element. In some examples, step 404 may use a machine learning model to analyze the textual input and/or the sketch to generate the at least one textual element. The machine learning model may be a machine learning model trained using training examples to generate textual elements based on textual inputs and/or sketches. An example of such training example may include a sample textual input and/or a sample sketch, together with a sample textual element. In some examples, step 404 may identify a first mathematical object in a mathematical space, wherein the first mathematical object may correspond to a first word of the textual input, for example using module 302. Further, step 404 may identify a second mathematical object in the mathematical space, wherein the second mathematical object may correspond to a second word of the textual input, for example using module 302. Further, step 404 may calculate a function of the first mathematical object and the second mathematical object to obtain a third mathematical object in the mathematical space, wherein the third mathematical object corresponds to a particular word, for example using module 304. In one example, the particular word may not be included in the textual input. Further, step 404 may include the particular word in the at least one textual element.

In some examples, step 404 may analyze the textual input and/or the sketch to determine at least one of a type of a user interface element in the new user interface, a size of a user interface element in the new user interface, a content of a user interface element in the new user interface, or a font associated with a user interface element in the new user interface. For example, step 404 may use a LLM to analyze the textual input to determine the at least one of a type of a user interface element in the new user interface, a size of a user interface element in the new user interface, a content of a user interface element in the new user interface, or a font associated with a user interface element in the new user interface. In another example, step 404 may use a machine learning model to analyze the textual input and/or a sketch to determine the at least one of a type of a user interface element in the new user interface, a size of a user interface element in the new user interface, a content of a user interface element in the new user interface, or a font associated with a user interface element in the new user interface. The machine learning model may be a machine learning model trained using training examples to determine at least one of the above details based on texts and/or sketches. An example of such training example may include a sample textual input and/or a sample sketch, together with a label indicative of at least one such detail.

In some examples, step 406 may comprise analyzing a textual input (such as textual input, the textual input received by step 402, the textual input received by step 802, textual data 102, etc.) and/or a sketch (such as the sketch received by step 402, the sketch received by step 802, sketch data 104, etc.) to obtain a layout for the at least two user interface elements. For example, step 406 may use step 606 to analyze the textual input and/or the sketch to obtain the layout. In some examples, the user interface may be a three-dimensional user interface, and the layout may specify for each element of the elements, a three-dimensional of position and/or a three dimensional volume of the respective element.

In some examples, step 408 may comprise generating a particular draft of a user interface (such as the new user interface of step 402) that includes user interface elements (such as the at least two user interface elements obtained by step 404, the plurality of visual elements of step 602, elements 162, etc.) based on a layout (such as the layout obtained by step 406, the layout obtained by step 606, layout 164, etc.). For example, the layout may specify locations for the user interface elements in the user interface, and the generated draft of the user interface may include the user interface elements positioned in the specified locations. In one example, the layout may specify timing for events in the user interface, and the generated draft of the user interface may include an orchestration of the events based on the timing. In one example, step 408 may encode the user interface elements and/or the layout in digital files (for example in an HTML format and/or a CSS format and/or a source code in a style sheet language and/or media files) to thereby generate the draft of the user interface.

In some examples, step 410 may comprise presenting a draft of a user interface (such as the particular draft of the new user interface generated by step 408) to an individual (such as the individual of step 402). For example, step 410 may present the draft of the user interface in a form that enables the individual to modify the user interface, for example as described above in relation to module 308. In one example, step 410 may use step 608 to generate the presentation of the draft of the user interface. In one example, step 410 may use module 308 to present the draft of the user interface.

In some examples, the presentation of the particular draft of the new user interface to the individual by step 410 may enable the individual to perform at least one of (exactly one of, at least two of, at least three of, at least four of, etc.) adding a new user interface element to the new user interface, removing a user interface element from the new user interface, modifying a type of a user interface element in the new user interface, modifying a position of a user interface element in the new user interface, modifying a size of a user interface element in the new user interface, modifying a content of a user interface element in the new user interface, or modifying a font associated with a user interface element in the new user interface.

In some examples, method 400 may generate a plurality of alternative drafts of the new user interface, for example by repeating steps 404, 406 and/or 408. For example, the alternative drafts may differ in layout (for example, each layout may be generated by using the generative model described in relation to step 406 with different random seed values) and/or included user interface elements. Further, method 400 may further comprise presenting the plurality of alternative drafts of the new user interface to the individual, for example in the same display screen, in different display screens, simultaneously, one after the other, and so forth. For example, each draft of the plurality of alternative drafts may be presented as described above in relation to step 410. Further, step 408 may comprise receiving from the individual a selection of the particular draft of the new user interface of the plurality of alternative drafts of the new user interface. For example, the selection may be received via a user interface, via a keyboard, via a pointing device, via a touchscreen, via voice command, via gesture recognition, and so forth.

In some examples, method 400 may further comprise, after the presenting the particular draft of the new user interface to the individual by step 410, receiving a modification to the textual input and/or the sketch received by step 402 from the individual. For example, the modification may be read from memory, may be received from an external device (for example, using digital communication device), may be received from the individual (for example, via a user interface, via a keyboard, via a pointing device, via a touchpad, via a touch screen, via speech recognition, via gestures, and so forth), may be determined based on data, and so forth. Further, method 400 may further comprise analyzing the modified textual input and/or the modified sketch to modify the new user interface. For example, by repeating steps 404 and/or 406 and/or 408 with the modified textual input and/or the modified sketch. In another example, by using step 510 and/or 512.

In some examples, method 400 may further comprise, after the presenting the particular draft of the new user interface to the individual by step 410, receiving an additional textual input from the individual, for example as described above in relation to step 402. Further, method 400 may further comprise analyzing the additional textual input to modify the new user interface, for example as described below in relation to steps 510 and/or 512.

In some examples, the presentation of the particular draft of the new user interface to the individual by step 410 may enable the individual to select portions of the particular draft of the new user interface, for example as described herein in relation to module 308 and/or step 504 and/or step 506. Further, method 400 may further comprise receiving from the individual a selection of a particular portion of the particular draft of the new user interface, for example as described below in relation to step 506. Further, method 400 may further comprise receiving from the individual a second textual input in a natural language (for example, in the natural language of step 402, in a different natural language, etc.), for example as described above in relation to step 402. The second textual input may be associated with a desire of the individual to modify the particular portion of the particular draft. Further, method 400 may further comprise analyzing the second textual input to determine a modification to the particular portion of the particular draft, for example as described below in relation to step 510. Further, method 400 may further comprise, based on the determined modification, generating a specific draft of the new user interface, for example as described below in relation to step

512. The specific draft may differ from the particular draft at least in the particular portion and may be identical to the particular draft at least in one other portion (for example, in all other portions). Further, method 400 may further comprise presenting the specific draft of the new user interface to the individual in a form that enables the individual to modify the new user interface, for example as described above in relation to step 410 and/or using module 308.

In some examples, method 400 may further comprise analyzing the textual input and/or the sketch to obtain a visual background for the new user interface. For example, the visual background may be or include an image, and method 400 may determine the image as described above in relation to step 404 and the at least one image included in the user interface elements. In another example, the visual background may be or include a video and/or an animation, and method 400 may use a generative model to analyze the textual input and/or the sketch to generate the video and/or the animation. In some examples, step 408 may further base the generation of the particular draft of the new user interface on the visual background. For example, the new user interface may include the visual background.

In some examples, method 400 may further comprise analyzing the textual input and/or the sketch to determine an audio element for the new user interface. In some examples, step 408 may further base the generation of the particular draft of the new user interface on the audio element. In one example, the audio element may be a background music, and the new user interface may include the background music. In one example, the audio element may be a sound effect, and the new user interface may include the sound effect. In some examples, method 400 may use a generative model to analyze the textual input and/or the sketch to generate the audio element. In some examples, method 400 may select, based on the textual input and/or the sketch, the audio element of a plurality of alternatives audio elements. For example, method 400 may select the audio element compatible with a description included in the textual input of the plurality of alternative audio elements. In some examples, method 400 may use a machine learning model to analyze the textual input and/or the sketch to generate the audio element. The machine learning model may be a machine learning model trained using training examples to generate audio elements based on texts and/or sketches. An example of such training example may include a sample textual input and/or a sample sketch, together with a sample audio element. In some examples, method 400 may identify a first mathematical object in a mathematical space, wherein the first mathematical object may correspond to a first word of the textual input, for example using module 302. Further, method 400 may identify a second mathematical object in the mathematical space, wherein the second mathematical object may correspond to a second word of the textual input, for example using module 302. Further, method 400 may calculate a function of the first mathematical object and the second mathematical object to obtain a third mathematical object in the mathematical space, for example using module 304. Further, method 400 may generate the audio element based on the third mathematical object. For example, method 400 may use a function of the third mathematical object as a random seed or an input of a generative model for generating the audio element.

In some examples, a textual input (such as textual input, the textual input received by step 402, textual data 102, etc.) may include an adjective. Further, a characteristic of a particular user interface element in the new user interface of method 400 (such as a particular user interface element of the at least two user interface elements obtained by step 404) may be based on the adjective. In one example, the adjective may be an adjective that describes size, and the characteristic of the particular user interface element may be a size of the particular user interface element. For example, the particular user interface element may be a text box, the textual input may include either 'The user may enter long descriptions' or 'The user may enter short descriptions', and the size of the text box may be bigger or smaller based on the adjective. In one example, the adjective may be an adjective that describes texture, and the characteristic of the particular user interface element may be a texture associated with at least part of the particular user interface element. For example, the particular user interface element may be a background, the textual input may include either 'Let's present everything over a smooth wall' or 'Let's present everything over a grainy wall', and the textual of the background may be either smooth or grainy based on the adjective. In one example, the adjective may be an adjective that describes color, and the characteristic of the particular user interface element may be a color associated with at least part of the particular user interface element. For example, the particular user interface element may be a textual element associated with a notification, the textual input may include either 'Let's show notification in dark red' or 'Let's show notification in light red', and the color of the textual element may be either dark or light red based on the adjective. In one example, the adjective may be an adjective that describes shape, and the characteristic of the particular user interface element may be a shape of the particular user interface element. For example, the particular user interface element may be a button, the textual input may include either 'Let's have round buttons' or 'Let's have oblong buttons', and the shape of the button may be selected based on the adjective.

In some examples, a textual input (such as textual input, the textual input received by step 402, textual data 102, etc.) may include an adverb. Further, a characteristic of a particular user interface element in the new user interface of method 400 (such as a particular user interface element of the at least two user interface elements obtained by step 404) may be based on the adverb. In one example, an appearance of the particular user interface element may be designed to change, the adverb may be an adverb that describes change, and the characteristic of the particular user interface element may be a change pattern associated with the particular user interface element. For example, the particular user interface element may be control. The control may have different appearances when it is available and when it is unavailable, the textual input may include either 'slowly turns dimmer when it becomes unavailable' or 'immediately turns dimmer when it becomes unavailable', and the pace of the change in appearance may be determined based on the adverb. In one example, the particular user interface element may be designed to move, the adverb may be an adverb that describes motion, and the characteristic of the particular user interface element may be a movement pattern associated with the particular user interface element. For example, the particular user interface element may be a notification, the textual input may include either 'After entering from the bottom, the notification slowly moves to the designated area' or 'After entering from the bottom, the notification quickly moves to the designated area', and a pace for the movement of the notification may be determined based on the adverb.

FIG. 5 is a flowchart of an exemplary method 500 for editing user interfaces from free text, consistent with some embodiments of the present disclosure. In this example, method 500 may comprise receiving digital data associated with a design of a user interface, the user interface includes a plurality of elements (step 502); using the digital data to cause a first presentation of the user interface to an individual, the first presentation is based on the design (step 504); receiving from the individual a selection of a portion of the user interface, the selected portion of the user interface includes at least two but not all elements of the plurality of elements (step 506); receiving from the individual a textual input in a natural language and/or a sketch, the textual input and/or the sketch are associated with a desire of the individual to modify a portion of the design of the user interface corresponding to the selected portion of the user interface (step 508); analyzing the textual input and/or the sketch to determine at least one change to the portion of the design of the user interface (step 510); implementing the determined at least one change to generate a modified design of the user interface (step 512); and causing a second presentation of the user interface to the individual, the second presentation is based on the modified design (step 514). In other examples, method 500 may include additional steps or fewer steps. In other examples, one or more steps of method 500 may be executed in a different order and/or one or more groups of steps may be executed simultaneously.

In some examples, step 502 may comprise receiving digital data associated with a design of a user interface. The user interface may include a plurality of elements. Some non-limiting example of such design may include generated design 160, a design of the new user interface generated by method 400 and/or step 408, the modified design generated by another implementation of method 500 and/or step 512, a design based on the layout obtained by method 600 and/or step 606, the third version of the design generated by method 700 and/or step 716, the first version of the design generated by method 800 and/or step 806, the second version of the design generated by method 800 and/or step 812, the first version of the design generated by method 900 and/or step 910, the second version of the design generated by method 900 and/or step 918, and so forth. In one example, receiving digital data by step 502 and/or step 702 may comprise reading the digital data from memory, may comprise receiving the digital data from an external device (for example, using digital communication device), may comprise generating the digital data based on other data (for example, based on a textual input, based on a sketch, based on an input from a user, based on other inputs, and so forth), and so forth. In one example, the digital data received by step 502 and/or step 702 may encode the design of the design of the user interface and/or design elements of the design of the user interface and/or a layout of the design of the user interface in digital files (for example in an HTML format and/or a CSS format and/or a source code in a style sheet language and/or media files).

In some examples, step 504 may comprise cause a first presentation of a user interface (such as the user interface of step 502, the user interface of step 702) to an individual. For example, step 504 may use digital data (such as the digital data received by step 502, the digital data received by step 702, etc.) to cause the first presentation of the user interface to the individual. The first presentation may be based on a design (such as the design of the user interface of step 502, the first version of the design of step 702, etc.). In one example, step 504 and/or step 704 may present the user interface in a form that enables the individual to modify the user interface, for example as described above in relation to module 308. In one example, the design may specify a layout, and step 504 and/or step 704 may use step 608 to generate the presentation of the user interface. In one example, step 504 may use module 308 to present the user interface.

In some examples, step 506 may comprise receiving a selection of a portion of a user interface (such as the user interface of step 502 and/or step 504). For example, step 506 may comprise receiving from an individual (such as the individual of step 504) a selection of the portion of the user interface. In one example, the user interface may include a plurality of elements (such as the plurality of elements of step 502), and the selected portion of the user interface of step 506 may include at least two but not all elements of the plurality of elements. In one example, step 506 may receive selected portion 110. For example, receiving the selection of the portion by step 506 may comprise reading the selection from memory, may comprise receiving the selection from an external device (for example, using digital communication device), may comprise receiving the selection from the individual (for example, via a user interface, via a keyboard, via a pointing device, via a touchpad, via a touch screen, via speech recognition, via gestures, and so forth), may comprise receiving the selection from an automated process, may comprise generating the selection based on data (for example, based on a textual input, based on a sketch, based on other inputs, and so forth), and so forth. In some examples, the selected portion of the user interface may correspond to a convex region of the user interface, to a concave region of the user interface, to a continuous region of the user interface, to a fragmented region of the user interface, and so forth. In some examples, step 506 may receive from an individual (such as the individual of step 504 and/or step 506 and/or step 508 and/or step 514) a second textual input in a natural language (for example, in the natural language of step 508, in a different natural language, etc.), for example as described below in relation to step 508. Further, step 506 may analyze the second textual input to select the portion of the user interface. For example, step 506 may use a LLM to analyze the second textual input and a textual description of the user interface (for example, a source code) to select the portion of the user interface. In some examples, step 506 may receive a pointing input from an individual (such as the individual of step 504 and/or step 506 and/or step 508 and/or step 514). The pointing input may be indicative of a particular position in the first presentation of the user interface. For example, the pointing input may be received from a pointing device (such as a computer mouse, a trackpad, a joystick, etc.). In another example, the pointing input may be received by analyzing image data to identify at least one gesture of the individual. In yet another example, the pointing input may be received via a touchscreen used for the first presentation of the user interface. Further, step 506 may use the particular position to select the portion of the user interface.

In some examples, step 508 may comprise receiving from the individual a textual input in a natural language and/or a sketch, for example as described above in relation to step 402. The textual input and/or the sketch may be associated with a desire of the individual to modify a portion of the design of the user interface corresponding to the selected portion of the user interface.

In some examples, step 510 may comprise analyzing a textual input (such as textual data 102, the textual input received by step 508, the first textual input received by step 706, the textual input received by step 802, etc.) and/or a sketch (such as sketch data 104, the sketch received by step 508, the sketch received by step 706, the sketch received by step 802, etc.) to determine at least one change to a selected portion of a design of a user interface (for example, to the portion of the design of the user interface of step 508, to selected portion 110, to the entire design of the user interface, etc.). In one example, the at least one change may include at least one of adding an element to the user interface or removing an element from the user interface. Other non-limiting examples of such changes may include changing a size of an element of the user interface, changing a color of at least part of an element of the user interface, changing a font, changing a layout of elements of the user interface, changing a position of an element of the user interface, changing distance between two elements of the user interface, changing appearance of an element of the user interface, changing a level of details associated with at least part of the user interface, changing a timing of an event associated with an element of the user interface, and so forth. In one example, step 510 may use a machine learning model to analyze the textual input and/or the sketch and/or additional information to determine the at least one change to the portion of the design of the user interface. In one example, the machine learning model may be a multimodal machine learning model. In one example, the machine learning model may be a machine learning model trained using training examples to determine changes to portions of user interfaces based on textual data and/or sketches and/or additional information. An example of such training example may include a sample textual input and/or a sample sketch and/or sample additional information, together with a label indicative of a sample change to a sample portion of a sample user interface. In one example, step 510 may further base the determination of the at least one change to the selected portion of the user interface on at least part of the digital data received by step 502. For example, the at least part of the digital data or a function of the at least part of the digital data may be used as the additional information when step 510 uses the machine learning model. In one example, step 510 may further base the determination of the at least one change to the selected portion of the user interface on at least part of the user interface. For example, the at least part of the user interface or a function of the at least part of the user interface may be used as the additional information when step 510 uses the machine learning model. For example, the at least part of the user interface may be or include at least part of the selected portion of the user interface, at least part of another portion of the user interface, the entire selected portion of the user interface, the entire user interface, and so forth. In some examples, the determination, by step 510, of the at least one change to the portion of the design of the user interface may be further based on a characteristic of a target audience (for example, on a characteristic of target audience 144). For example, step 510 may use the machine learning model with the characteristic of the target audience as the additional information. In some example, the determination, by step 510, of the at least one change to the portion of the design of the user interface may be further based on a particular design style (such as style 148). For example, step 510 may use the machine learning model with information associated with the particular design style as the additional information.

In some examples, step 510 may identify a first mathematical object in a mathematical space, wherein the first mathematical object may correspond to a first word of the textual input, for example using module 302. Further, step 510 may identify a second mathematical object in a mathematical space, wherein the second mathematical object may correspond to a second word of the textual input, for example using module 302. Further, step 510 may calculate a function of the first mathematical object and the second mathematical object to obtain a third mathematical object in the mathematical space, for example using module 304. Further, step 510 may base the determination of the at least one change to the portion of the design of the user interface on the third mathematical object. For example, step 510 may use a function of the third mathematical object as a random seed or an input of a generative model for generating the at least one change.

In some examples, step 510 may identify a first mathematical object in a mathematical space, wherein the first mathematical object may correspond to a word of the textual input, for example using module 302. Further, step 510 may analyze digital data (such as the digital data received by step 502) to identify a second mathematical object in a mathematical space, for example using module 306. Further, step 510 may calculate a function of the first mathematical object and the second mathematical object to obtain a third mathematical object in the mathematical space, for example using module 304. Further, step 510 may base the determination of the at least one change to the portion of the design of the user interface on the third mathematical object. For example, step 510 may use a function of the third mathematical object as a random seed or an input of a generative model for generating the at least one change.

In some examples, the sketch analyzed by step 510 may include a plurality of pixel values. Further, step 510 may calculate a convolution of at least part of the pixel values of the sketch to obtain a result value. Further, step 510 may identify a first mathematical object in a mathematical space, wherein the first mathematical object may correspond to a word of the textual input, for example using module 302. Further, step 510 may calculate a function of the result value and the first mathematical object to obtain a second mathematical object in the mathematical space, for example using module 304. Further, step 510 may base the determination of the at least one change to the portion of the design of the user interface on the second mathematical object. For example, step 510 may use a function of the second mathematical object as a random seed or an input of a generative model for generating the at least one change.

In some examples, the textual input may include a noun. Further, based on the noun, step 510 may select a particular element of the elements included in the selected portion of the user interface (of step 506). For example, step 510 may use a LLM to analyze the textual input including the noun and a textual description of the elements included in the selected portion of the user interface to select the particular element. Further, based on the selection of the particular element, step 510 may include a change to the particular element in the at least one change. For example, the textual input may include 'The dropdown menu occupies too much space', and in response step 510 may include a decrease of the size of the dropdown menu. In this example, the plurality of elements of step 502 may include two or more dropdown menus, only one of the dropdown menus may be included in the selected portion of the user interface, and step 510 may decrease the size of the dropdown menu included in the selected portion of the user interface.

In some examples, the textual input may include a pronoun. Further, based on the pronoun, step 510 may select a particular element of the elements included in the selected portion of the user interface (of step 506). For example, step 510 may use a LLM to analyze the textual input including the pronoun and a textual description of the elements included in the selected portion of the user interface to select the particular element. Further, based on the selection of the particular element, step 510 may include a change to the particular element in the at least one change. For example, the textual input may include either 'There is a clutter here, remove her image' or 'There is a clutter here, remove his image', and step 510 may include in the at least one change a removal from the selected portion of the user interface either her or his image to reduce the clutter.

In some examples, the textual input may include a verb. Further, based on the verb, step 510 may select a type of change. For example, step 510 may use a LLM to analyze the textual input including the verb and selecting the type of change. Further, step 510 may include a change of the selected type in the at least one change. In one example, the verb may be associated with a noun and/or a pronoun in the textual input, step 510 may select a particular element of the elements included in the selected portion of the user interface (of step 506) based on the noun and/or the pronoun (for example as described above), and step 510 may include a change of the selected type to the particular element in the at least one change. For example, the textual input may include either 'Quiver the notification to draw attention to it' or 'Flicker the notification to draw attention to it', and step 510 may make the notification in the selected portion either quiver or flicker based on the verb. In one example, the verb may be associated with at least one of a user or a viewer of the user interface. For example, when the textual input includes 'Most important to our clients is the ability to easily see the status', step 510 may include in the at least one change a size change to enlarge the status indicator, and when the textual input includes 'Most important to our clients is the ability to easily change the status', step 510 may include in the at least one change an addition change to add of a user interface element for modifying the status.

In some examples, the textual input may include a preposition. Further, based on the preposition, step 510 may select a new location for a particular element of the elements included in the selected portion of the user interface. For example, step 510 may use a LLM to analyze the textual input including the preposition and selecting the new location. Further, step 510 may include a change of a location of the particular element to the new location in the at least one change. For example, the textual input may include either 'Put the status above the notifications' or 'Put the status below the notifications', and step 510 may include in the at least one change moving the status indicator to a position above or below the notifications based on the preposition.

In some examples, the textual input may include a preposition. Further, based on the preposition, step 510 may select a new timing for a particular animation associated with a particular element of the elements included in the selected portion of the user interface. For example, step 510 may use a LLM to analyze the textual input including the preposition and selecting the new timing. Further, step 510 may include a change to a timing of the particular animation based on the new timing in the at least one change. For example, the textual input may include either 'Highlight the text after the user edits it' or 'Highlight the text while the user edits it', and step 510 may include timing an animation for highlighting the text based on the preposition.

In some examples, the textual input may include an adverb. Further, based on the adverb, step 510 may determine a change to a particular animation associated with a particular element of the elements included in the selected portion of the user interface. For example, step 510 may use a LLM to analyze the textual input including the adverb and determining the change to the particular animation. Further, step 510 may include the determined change to the particular animation in the at least one change. For example, the change to the particular animation may include at least one of a change to a pace associated with the particular animation, a change to a frequency associated with the particular animation, a change to timing associated with the particular animation, a change to a type of the particular animation, a change to a location associated with the particular animation, or a change to an extent associated with the particular event. In one example, the textual input may include either 'The notification should move slowly to the designated area' or 'The notification should move quickly to the designated area', and step 510 may modify the motion speed of the notification based on the adverb.

In some examples, the textual input may include an adjective. Further, based on the adjective, step 510 may select a new color scheme for a particular element of the elements included in the selected portion of the user interface. For example, step 510 may use a LLM to analyze the textual input including the adjective and select the new color scheme. Further, step 510 may include a change of a color scheme of the particular element to the new color scheme in the at least one change. For example, the textual input may include either 'Make it classic' or 'Make it sweet', and step 510 may select a neutral new color scheme or a pastel new color scheme based on the adjective.

In some examples, the textual input may include an adjective. Further, based on the adjective, step 510 may select a new size for a particular element of the elements included in the selected portion of the user interface. For example, step 510 may use a LLM to analyze the textual input including the adjective and select the new size. Further, step 510 may include a change of a size of the particular element to the new size in the at least one change. For example, when the textual input includes 'Make it apparent', step 510 may select the new size to be bigger, and when the textual input includes 'Make it obscured', and step 510 may select the new size to be smaller.

In some examples, the textual input may include an adjective. Further, based on the adjective, step 510 may select a new appearance for a particular element of the elements included in the selected portion of the user interface. For example, step 510 may use a LLM to analyze the textual input including the adjective and select the new appearance. Further, step 510 may include a change of an appearance of the particular element to the new appearance in the at least one change. For example, the textual input may include either 'This needs to be elegant' or 'This needs to be alluring', and step 510 may generate the new appearance based on the adjective.

In some examples, the textual input may include an adjective. Further, based on the adjective, step 510 may select a new layout for the elements included in the selected portion of the user interface, for example as described below in relation to step 606. Further, step 510 may include in the at least one change a change of a layout of the elements included in the selected portion of the user interface to the new layout. For example, the textual input may include either 'Arrange these in a symmetric structure' or 'Arrange these in a linear structure', and step 510 may select either a symmetrical or linear structure based on the adjective.

In some examples, the textual input may include a conjunction. Further, the elements included in the selected portion of the user interface may include at least a first element and a second element. Further, based on the conjunction, step 510 may determine a change to a spatial relation between the first element and the second element.

For example, step 510 may use a LLM to analyze the textual input including the conjunction and determine the change to the spatial relation. Further, step 510 may include the determined change to the spatial relation between the first element and the second element in the at least one change. For example, when the textual input includes 'Put the indicator and the breadcrumbs on the top', step 510 may include moving both the indicator and the breadcrumbs to the top, and when the textual input includes 'Put the indicator or the breadcrumbs on the top', step 510 may include moving only the breadcrumbs to the top, leaving the indicator at the bottom.

In some examples, step 512 may comprise implementing at least one change (such as the at least one change determined by step 512) to generate a modified design of a user interface (such as the user interface of step 502). In one example, implanting the at least one change may include encoding the modified design of the user interface and/or design elements of the modified design of the user interface and/or a layout of the modified design of the user interface in digital files (for example in an HTML format and/or a CSS format and/or a source code in a style sheet language and/or media files). For example, the digital data received by step 502 may include initial digital files, as described above, and step 512 may modify the initial digital files based on the at least one change to generate the new digital files. In another example, step 512 may analyze the design of the user interface of step 502 (for example, analyzing the digital files received by step 502) and the at least one change to generate the new digital files, for example using a generative model.

In some examples, step 514 may comprise causing a second presentation of the user interface, for example to an individual (such as the individual of step 504 and/or step 506 and/or step 508). The second presentation may be based on a design (such as the modified design generated by step 512, the second version of the design generated by step 710, etc.). In one example, step 514 may present the user interface in a form that enables the individual to modify the user interface, for example as described above in relation to module 308. In one example, the design may specify a layout, and step 514 may use step 608 to generate the presentation of the user interface. In one example, step 514 may use module 308 to present the user interface.

In some examples, method 500 may further comprise, after the second presentation caused by step 514, receiving from an individual (such as the individual of step 504 and/or step 506 and/or step 508 and/or step 514) a second textual input in a natural language (for example, in the natural language of step 508, in a different natural language, etc.) and/or a second sketch, for example as described above in relation to step 508. The second textual input and/or the second sketch may be associated with a second desire of the individual to modify the portion of the design of the user interface corresponding to the selected portion of the user interface of step 506. Further, method 500 may further comprise analyzing the second textual input and/or the second sketch to determine a second at least one change to the portion of the design of the user interface, for example as described above in relation to step 510. Further, method 500 may further comprise implementing the determined second at least one change to generate a second modified design of the user interface, for example as described above in relation to step 512. Further, method 500 may further comprise causing a third presentation of the user interface to the individual, wherein the third presentation may be based on the second modified design, for example as described above in relation to step 514.

In some examples, method 500 may further comprise, after the second presentation caused by step 514, receiving from an individual (such as the individual of step 504 and/or step 506 and/or step 508 and/or step 514) a second textual input in a natural language (for example, in the natural language of step 508, in a different natural language, etc.), for example as described above in relation to step 508. In one example, the second textual input includes an interjection. Further, method 500 may further comprise, based on the interjection, determining a degree of success in the determination (of step 510) of the at least one change to the portion of the design of the user interface. For example, method 500 may use a LLM to analyze the second textual input including the interjection to determine the degree of success. Further, method 500 may further comprise, based on the determined degree of success, generating a second modified design of the user interface. For example, when the interjection indicates displeasure (such as 'Hmph'), method 500 may generate the second modified design, and when the interjection indicates an acknowledgement that something is right (such as 'Bingo'), method 500 may forgo generating the second modified design. Further, method 500 may further comprise causing a third presentation of the user interface to the individual, wherein the third presentation may be based on the second modified design, for example as described above in relation to step 514.

In some examples, method 500 may further comprise, after the second presentation caused by step 514, receiving from the individual a selection of a second portion of the user interface, for example as described above in relation to step 506. The selected second portion may include at least two but not all elements of the plurality of elements of step 502. In one example, the portion of the user interface and the second portion of the user interface may have no user interface element in common. In one example, the portion of the user interface and the second portion of the user interface may have at least one (exactly one, at least two, at least five, etc.) but not all user interface elements in common. Further, method 500 may further comprise, receiving from an individual (such as the individual of step 504 and/or step 506 and/or step 508 and/or step 514) a second textual input in a natural language (for example, in the natural language of step 508, in a different natural language, etc.), for example as described above in relation to step 508. The second textual input may be associated with a desire of the individual to modify a second portion of the design of the user interface corresponding to the selected second portion of the user interface. Further, method 500 may further comprise, analyzing the second textual input to determine a second at least one change to the second portion of the design of the user interface, for example as described above in relation to step 510. Further, method 500 may further comprise, implementing the determined second at least one change to generate a second modified design of the user interface, for example as described above in relation to step 512. Further, method 500 may further comprise causing a third presentation of the user interface to the individual, wherein the third presentation may be based on the second modified design, for example as described above in relation to step 514.

Figure 6:
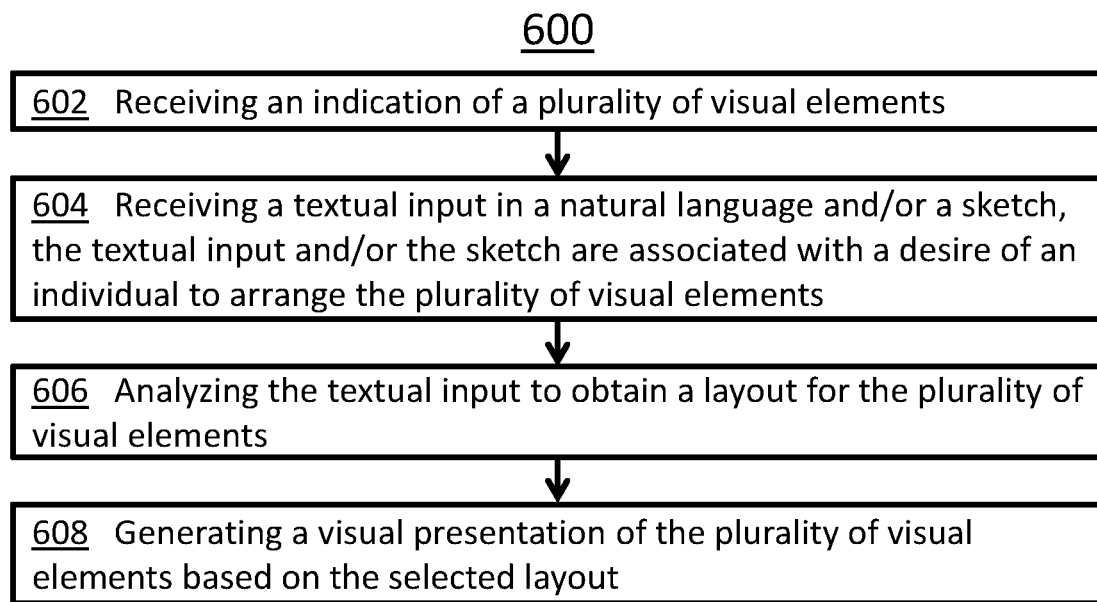
FIG. 6 is a flowchart of an exemplary method for selecting layouts for user interfaces using free text, consistent with some embodiments of the present disclosure.

FIG. 6 is a flowchart of an exemplary method 600 for selecting layouts for user interfaces using free text, consistent with some embodiments of the present disclosure. In this example, method 600 may comprise receiving an indication of a plurality of visual elements (step 602); receiving a textual input in a natural language and/or a sketch, the textual input and/or the sketch are associated with a desire of an individual to arrange the plurality of visual elements (step 604); analyzing the textual input to obtain a layout for the plurality of visual elements (step 606); and generating a visual presentation of the plurality of visual elements based on the selected layout (step 608). In other examples, method 600 may include additional steps or fewer steps. In other examples, one or more steps of method 600 may be executed in a different order and/or one or more groups of steps may be executed simultaneously. Some non-limiting examples of such visual elements may include images, videos, animations, illustrations, logos, visual user interface elements, and so forth. In some examples, the plurality of visual elements of step 602 may be a plurality of visual user interface elements, and method 600 may further comprise generating a user interface that includes the plurality of visual user interface elements based on the layout, for example as described above in relation to step 408.

In some examples, step 602 may comprise receiving an indication of a plurality of visual elements. For example, receiving the indication by step 602 may comprise reading the indication from memory, may comprise receiving the indication from an external device (for example, using digital communication device), may comprise receiving the indication from an individual (for example, via a user interface, via a keyboard, via a pointing device, via a touchpad, via a touch screen, via speech recognition, via gestures, and so forth), may comprise determining the indication based on data (for example, using step 404 to analyze the textual input and/or sketch received by step 604 to obtain a plurality of visual user interface elements), and so forth.

In some examples, step 604 may comprise receiving a textual input in a natural language and/or a sketch, for example as described above in relation to step 402. The textual input and/or the sketch may be associated with a desire of an individual to arrange the plurality of visual elements.

In some examples, step 606 may comprise analyzing a textual input (such as the textual input received by step 604 and/or step 402, textual data 102, etc.) and/or a sketch (such as the sketch received by step 402, sketch data 104, etc.) to obtain a layout for a plurality of elements (for example, for the plurality of visual elements of step 602, for the user interface elements obtained by step 404, for elements 162, etc.). An example of such layout is layout 164. In one example, step 606 may comprise analyzing the textual input and/or the sketch to select the layout of a group of alternative layouts. In one example, step 404 may comprise analyzing the textual input and/or the sketch to generate the layout, for example using a generative model. In one example, step 606 may comprise using a machine learning model (such as a unimodal machine learning model, a multimodal machine learning model, a generative model, etc.) to analyze textual input (such as the textual input received by step 604 and/or step 402, textual data 102, etc.) and/or a sketch (such as the sketch received by step 402, sketch data 104, etc.) and/or additional information to obtain the layout for a plurality of elements (for example, for the plurality of visual elements of step 602, for the user interface elements obtained by step 404, etc.). The machine learning model may be a machine learning model trained using training examples to generate layouts and/or to select layouts of a plurality of alternatives based on textual information and/or visual information and/or additional information. An example of such training example may include a sample textual input and/or a sample sketch and/or sample additional information, together with a label indicative of a sample selection of sample layout of a sample plurality of alternatives and/or of sample layout. In one example, the layout obtained by step 606 may be based on a characteristic of the individual of step 402 and/or step 604. For example, step 606 may use the machine learning model with the characteristic of the individual as the additional information. Some non-limiting examples of such characteristics of the individual may include a design style associated with the individual, demographic of the individual, geographical location associated with the individual, an indication of a preference of the individual, past actions and/or behavior of the individual, and so forth. In one example, the layout obtained by step 606 may be based on a characteristic of a target audience (for example, on a characteristic of target audience 144). For example, step 606 may use the machine learning model with the characteristic of the target audience as the additional information. In one example, the layout obtained by step 606 may be based on a particular design style (such as style 148). For example, the layout may be in the particular design style. In another example, step 606 may use the machine learning model with an indication of the particular design style as the additional information. In some examples, the textual input may be indicative of an occasion, and the layout may be based on the occasion. For step 606 may use the machine learning model with an indication of the occasion as the additional information. In some examples, the layout may be based on a time of year. For step 606 may use the machine learning model with an indication of the time of year as the additional information. In one example, the textual input may be indicative of the time of year.

In some examples, step 606 may identify a first mathematical object in a mathematical space, the first mathematical object corresponds to a first word of the textual input, for example using module 302. Further, step 606 may identify a second mathematical object in the mathematical space, the second mathematical object corresponds to a second word of the textual input, for example using module 302. Further, step 606 may calculate a function of the first mathematical object and the second mathematical object to obtain a third mathematical object in the mathematical space, for example using module 304. Further, step 606 may obtain the layout for the elements based on the third mathematical object. For example, when the third mathematical object is one object, step 606 may select one layout from a plurality of alternatives, and when the third mathematical object is another object, step 606 may select a different layout from the plurality of alternatives. In another example, step 606 may use a generative model to generate the layout (for example as described above), and may use the third mathematical object as a seed for the generative model.

In some examples, the sketch may include a plurality of pixel values. Further, step 606 may calculate a convolution of at least part of the pixel values of the sketch to obtain a result value. Further, step 606 may identify a first mathematical object in the mathematical space, wherein the first mathematical object corresponds to a word of the textual input, for example using module 302. Further, step 606 may calculate a function of the result value and the first mathematical object to obtain a second mathematical object in the mathematical space, for example using module 304. Further, step 606 may obtain the layout for the plurality of visual elements based on the second mathematical object, for example as described above in relation to the third mathematical object.

In some examples, step 606 may generate a source code in a style sheet language based on the layout. A non-limiting example of such style sheet language is CSS. For example, the source code may encode at least part of the payout. In another example, the source code may include instructions for presenting the elements based on at least part of the layout.

In some examples, the textual input may include a first portion and a second portion, the first portion may include a first noun, the second portion may include a second noun, and the second noun may differ from the first noun. Further, step 606 may select a first element (such as a first visual element, a first user interface element, etc.) of the elements based on the first noun, for example using a LLM. Further, step 606 may select a second element (such as a first visual element, a first user interface element, etc.) of the elements based on the second noun, for example using a LLM. The second element may differ from the first element. Further, step 606 may analyze the first portion to select a first position for the first element, for example using a LLM. Further, step 606 may analyze the second portion to select a second position for the second visual element, for example using a LLM. The second position may differ from the first position. Further, step 606 may include in the layout a positioning of the first element at the first position and a positioning of the second element at the second position. For example, the textual input may include 'Let's have a dropdown menu for room selection as the last piece of input in the form, and make sure that it does not hide the submit button when it's open', and step 606 may include in the layout a positioning of the dropdown menu for room selection below all other inputs of the form, and a positioning of the submit button below the dropdown menu with enough space between the two so that when the dropdown menu is open, it doesn't hide the button. In one example, the first portion and the second portion may have no word in common. In another example, the first portion and the second portion may have at least two but not all words in common.

In some examples, the textual input may include a first portion and a second portion, the first portion may include a first pronoun, the second portion may include a second pronoun, and the second pronoun may differ from the first pronoun. Further, step 606 may select a first element (such as a first visual element, a first user interface element, etc.) of the elements based on the first pronoun, for example using a LLM. Further, step 606 may select a second element (such as a first visual element, a first user interface element, etc.) of the elements based on the second pronoun, for example using a LLM. The second element may differ from the first element. Further, step 606 may analyze the first portion to select a first position for the first element, for example using a LLM. Further, step 606 may analyze the second portion to select a second position for the second visual element, for example using a LLM. The second position may differ from the first position. Further, step 606 may include in the layout a positioning of the first element at the first position and a positioning of the second element at the second position. For example, the textual input may include 'Let's have her data on the top and his data below it', and step 606 may position Jane's information on the top of the form and John's information after Jane's information. In one example, the first portion and the second portion may have no word in common. In another example, the first portion and the second portion may have at least two but not all words in common.

In some examples, the textual input may include at least a verb, and step 606 may obtain the layout for the plurality of visual elements based on the verb. In one example, the verb may be a verb associated with at least one of a user or a viewer of the user interface. For example, when the textual input includes 'Most important to our clients is the ability to immediately see the status', step 606 may position an indication of the status at a central location while positioning controls for updating the status in a less central position, and when the textual input includes 'Most important to our clients is the ability to immediately update the status', step 606 may position the indication of the status and the controls for updating the status at the central location.

In some examples, the textual input may include at least a preposition. Further, step 606 may select a position for a particular element of a plurality of elements (such as a particular visual element of the plurality of visual elements of step 602, a particular user interface element of the user interface elements obtained by step 404, a particular element of elements 162, etc.) based on the preposition, and may include in the layout a positioning of the particular element at the selected position. In one example, the textual input may include at least a preposition, and a relative position of two elements of the plurality of elements (such as two visual elements of the plurality of visual elements of step 602, two user interface elements of the user interface elements obtained by step 404, two elements of elements 162, etc.) in the layout obtained by step 606 may be based on the preposition. For example, the textual input may include either 'Put the status above the notifications' or 'Put the status below the notifications', and step 606 may position the status indicator above or below the notifications based on the preposition.

In some examples, the textual input may include at least an adjective. Further, a relative position of two elements of the plurality of elements (such as two visual elements of the plurality of visual elements of step 602, two user interface elements of the user interface elements obtained by step 404, two elements of elements 162, etc.) in the layout obtained by step 606 may be based on the adjective. For example, the textual input may include either 'A boy stands left to his mom' or 'A boy stands right to this mom', and step 606 may position the boy left or right to his mom based on the adjective.

In some examples, the textual input may include at least an adverb. Further, a position for a particular element of a plurality of elements (such as a particular visual element of the plurality of visual elements of step 602, a particular user interface element of the user interface elements obtained by step 404, a particular element of elements 162, etc.) in the layout obtained by step 606 may be based on the adverb. For example, the textual input may include either 'The user rarely checks the status' or 'The user frequently checks the status', and step 606 may position the status indicator in an accessible position or in a less accessible position based on the adverb.

In some examples, the layout obtained by step 606 may include a movement of a particular element of a plurality of elements (such as a particular visual element of the plurality of visual elements of step 602, a particular user interface element of the user interface elements obtained by step 404, a particular element of elements 162, etc.). Further, the textual input may include at least an adverb, and step 606 may select a parameter of the movement based on the adverb. Some non-limiting examples of such parameter may include a pace associated with the movement, a frequency associated with the movement, a timing associated with the movement, a type of the movement, a location associated with the movement, an extent associated with the movement, and so forth. For example, the textual input may include either 'After entering from the bottom, the notification slowly moves to the designated area' or 'After entering from the bottom, the notification quickly moves to the designated area', and step 606 may select a pace for the movement of the notification based on the adverb.

In some examples, the textual input may include at least a conjunction. Further, the layout obtained by step 606 may include a positioning of a first element of a plurality of elements (such as a first visual element of the plurality of visual elements of step 602, a first user interface element of the user interface elements obtained by step 404, a first element of elements 162, etc.) closer to a second element of a plurality of elements (such as a second visual element of the plurality of visual elements of step 602, a second user interface element of the user interface elements obtained by step 404, a second element of elements 162, etc.) than to a third element of a plurality of elements (such as a third visual element of the plurality of visual elements of step 602, a third user interface element of the user interface elements obtained by step 404, a third element of elements 162, etc.) based on the conjunction. For example, when the textual input includes 'Bob is free, but Jane and John are in the penalty box', step 606 may position Jane and John together in the penalty box closer to each other than to Bob who is far from the penalty box, and when the textual input includes 'Bob is free, but Jane and John are in the penalty box', step 606 may position Jane in the penalty box, away from John and Bob who stands closely together far from the penalty box.

In some examples, step 608 may comprise generating a visual presentation of elements (such as the plurality of visual elements of step 602, the user interface elements obtained by step 404, elements 162, etc.) based on a layout (such as the layout obtained by step 606, the layout obtained by step 406, layout 164, etc.). For example, the elements and/or the layout may be encoded in digital files (for example in an HTML format and/or a CSS format and/or a source code in a style sheet language and/or media files), and step 608 may cause the visual presentation using a viewer software (such as a web browser). For example, step 608 may transmit digital signals based on the digital files to cause the visual presentation. In one example, step 608 may present the elements based on the layout to an individual (such as the individual of step 604). In some examples, step 608 may use module 308 to generating a visual presentation of the elements based on the layout. In one example, step 608 may present the elements based on the layout using at least one of a display screen or a touch screen. In one example, step 608 may present the elements based on the layout in an extended reality environment using an extended reality appliance. In some examples, the visual presentation of step 608 may be a three-dimensional presentation of the elements, and, for each element of the elements, a three-dimensional of position of the respective element may be based on the layout. For example, for each visual element of the plurality of visual elements, a three-dimensional of position of the respective visual element may be based on the layout.

In some examples, the layout obtained by step 606 may be associated with a first presentation manner, and method 600 may further comprise analyzing the textual input to obtain a second layout for the plurality of elements (for example, for the plurality of visual elements of step 602, for the user interface elements obtained by step 404, for elements 162, etc.), for example as described above in relation to step 606. The second layout may be associated with a second presentation manner. The second presentation manner may differ from the first presentation manner. The second layout may differ from the first layout. For example, the presentation manners may be presentation using different types of devices (for example, using a touchscreen or a non-touch screen, using a smartphone or a personal computer, etc.), using different operating systems, using different web browsers, using a display regions of different sizes, and so forth. In one example, method 600 may further comprise receiving an indication of a presentation manner, and step 606 may further base the obtaining of the layout on the presentation manner. For example, step 606 may access, based on the presentation manner, a data-structure associating presentation manners with rules, to obtain a particular rule. Further, step 606 may generate the layout and/or select the layout of a plurality of alternatives based on the particular rule. Some non-limiting examples of such rules may include 'Notifications are presented in the bottom right corner' or 'Keep at least five pixels between elements'. In some examples, the first presentation manner be associated with a first type of device, the second presentation manner be associated with a second type of device. Further, step 608 may cause a device of the first type to present the plurality of elements based on a layout obtained by step 606 based on the first presentation manner, and step 608 may cause a device of the second type to present the plurality of elements based on a layout obtained by step 606 based on the second presentation manner.

In some examples, step 606 may base the obtaining the layout for the plurality of elements (for example, for the plurality of visual elements of step 602, for the user interface elements obtained by step 404, for elements 162, etc.) on a characteristic of a target audience (such as target audience 144). In one example, step 606 may access, based on the characteristic of the target audience, a data-structure associating characteristics of the target audiences with rules, to obtain a particular rule. Further, step 606 may generate the layout and/or select the layout of a plurality of alternatives based on the particular rule. For example, the rule for elderly audiences may include a minimal size for elements. In another example, the rule for audience with attention deficit may include a limitation on presentation manner of notifications. In some examples, step 608 may cause a presentation to a first audience of the plurality of elements based on a layout obtained by step 606 based on a characteristic of the first audience, and step 608 may cause a presentation to a second audience of the plurality of elements based on a layout obtained by step 606 based on a characteristic of the second audience. In some examples, method 600 may further comprise receiving an indication of the characteristic of the target audience and/or of the target audience. In one example, textual data in a natural language (such as the textual input received by step 604 and/or step 402, textual data 102, textual data in the natural language of the textual input, textual data in a different natural language, etc.) may be analyzed to determine the characteristic of the target audience, for example using an LLM. For example, the textual input may include 'We are selling bags to elderly women', and the target audience may be 'elderly women'. In one example, historic activities of individuals associated with the target audience may be analyzed to determine the characteristic of the target audience. For example, the historic activities may show that the individuals associated with the target audience tend to react to a larger font more than the general population, and the characteristic of the target audience may be 'susceptible to larger fonts'.

In some examples, step 606 may base the obtaining the layout for the plurality of elements (for example, for the plurality of visual elements of step 602, for the user interface elements obtained by step 404, for elements 162, etc.) on a particular design style (such as style 148). For example, the particular design style may be associated with an inclination to layout that have a particular characteristic, and step 606 may generate the layout and/or select the layout of a plurality of alternatives based on the particular characteristic. In another example, step 606 may access, based on the characteristic of the particular design style, a data-structure associating design styles with generative models, to obtain a particular generative model trained to generate layouts in the particular design style. Further, step 606 may use the particular generative model to analyze the textual input to obtain the layout. In some examples, method 600 may further comprise receiving an indication of the particular design style. In one example, textual data in a natural language (such as the textual input received by step 604 and/or step 402, textual data 102, textual data in the natural language of the textual input, textual data in a different natural language, etc.) may be analyzed to determine the particular design style, for example using LLM. For example, the textual input received from the individual may include 'Arrange the elements in my usually style', and in response layouts of designs made by the individual may be analyzed to determine the particular design style. In another example, at least one other layout may be analyzed to determine the particular design style. For example, a generative model may be trained using the at least one other layout, and step 606 may use the trained generative model to the trained generative model to analyze the textual input to obtain the layout. In one example, the at least one other layout may be at least one layout associated with a specific designer. In one example, the at least one other layout may be at least one layout associated with a specific brand. In one example, the at least one other layout may be at least one layout associated with a specific subject matter.

In some examples, step 606 may comprise selecting a type for the layout, and obtaining the layout for the plurality of visual elements based on the selected type. Some non-limiting examples of such types may include static layout, fluid layout, responsive layout, adaptive layout, single-page layout, multi-page layout, grid layout, masonry layout, full-screen layout, magazine layout, parallax layout, single-column layout, zigzag layout, split-screen layout, or asymmetrical layout. For example, step 606 may access, based on the selected type, a data-structure associating types of layouts with generative models, to obtain a particular generative model trained to generate layouts of the selected type. Further, step 606 may use the particular generative model to analyze the textual input to obtain the layout. In some examples, step 606 may analyze the textual input (such as the textual input received by step 604 and/or step 402, textual data 102, textual data in the natural language of the textual input, textual data in a different natural language, etc.) to select the type for the layout, for example using a LLM. In one example, step 606 may analyze the sketch (such as the sketch received by step 402, sketch data 104, etc.) to select the type for the layout, for example using a visual classification model, where each class is associated with a type. In some examples, step 606 may base the selection of the type for the layout on a particular design style (such as style 148). For example, the particular design style may be associated with an inclination to the type for the layout. In some examples, step 606 may base the selection of the type for the layout on target audience (such as target audience 144). For example, historic activities of individuals associated with the target audience may be analyzed to determine that the individuals associated with the target audience tend to react to the type of layout, and thereby step 606 may select the type of layout.

In some examples, method 600 may further comprise, after step 608 generates the visual presentation, receiving a second textual input in the natural language and/or a second sketch, for example as described above in relation to the textual input, the sketch and step 604. The second textual input and/or the second sketch may be associated with a desire of the individual to change the layout. Further, method 600 may further comprise analyzing the second textual input to determine at least one change to the layout, for example as describe above in relation to step 510. Further, method 600 may further comprise implementing the determined at least one change to obtain a second layout for the plurality of visual elements, for example as described above in relation to step 512. Further, method 600 may further comprise generating a second visual presentation of the plurality of visual elements based on the second layout, for example as described above in relation to step 608.

In some examples, method 600 may further comprise receiving an indication of a draft layout. For example, the indication may be read from memory (such as memory 210), may be received from an external computing device (for example, using a digital communication device), may be generated (for example, using previous use of method 600, using method 400, using method 500, etc.), may be received from an individual (for example, via a user interface), and so forth. In some examples, step 606 may comprise analyzing the textual input to determine at least one change to the draft layout (for example as describe above in relation to step 510), and implementing the determined at least one change to obtain the layout for the plurality of visual elements, for example as described above in relation to step 512. In one example, the draft layout may be a sketch of a layout received from the individual, for example by step 604.

FIG. 7 is a flowchart of an exemplary method 700 for generating and editing user interfaces via chat, consistent with some embodiments of the present disclosure. In this example, method 700 may comprise receiving digital data associated with a first version of a design of a user interface (step 702); using the digital data to cause a first presentation of the user interface to an individual based on the first version of the design (step 704); receiving from the individual a first textual input in a natural language and/or a first sketch associated with a desire of the individual to modify the design of the user interface (step 706); analyzing the first textual input and/or the first sketch to determine at least one change to the first version of the design of the user interface, the at least one change is associated with a level (step 708); implementing the at least one change to generate a second version of the design of the user interface associated with the level (step 710); causing a second presentation of the user interface to the individual based on the generated second version of the design (step 712); receiving from the individual a second textual input in a natural language and/or a second sketch associated with a desire of the individual to adjust the level (step 714); analyzing the second textual input and/or the second sketch to generate a third version of the design of the user interface, the third version is associated with an adjusted level (step 716); and causing a third presentation of the user interface to the individual based on the generated third version of the design (step 718). In other examples, method 700 may include additional steps or fewer steps. In other examples, one or more steps of method 700 may be executed in a different order and/or one or more groups of steps may be executed simultaneously.

In some examples, step 702 may comprise receiving digital data associated with a first version of a design of a user interface, for example as described above in relation to step 502. In some examples, step 704 may comprise using digital data (such as the digital data received by step 702) to cause a first presentation of a user interface (such as the user interface of step 702) to an individual, for example as described above in relation to step 504. The first presentation may be based on the first version of the design of step 702. In one example, step 704 may use module 308 to present the user interface.

In some examples, step 706 may comprise receiving from the individual a first textual input in a natural language and/or a first sketch, for example as described above in relation to step 402. The first textual input and/or the first sketch may be associated with a desire of the individual to modify the design of the user interface. In some examples, step 714 may comprise receiving from an individual (such as the individual of step 704) a second textual input in the natural language and/or a second sketch, for example as described above in relation to step 402. The second textual input and/or the second sketch may be associated with a desire of the individual to adjust the level.

In some examples, step 708 may comprise analyzing a textual input (such as the first textual input received by step 706) and/or a sketch (such as the first sketch received by step 706) to determine at least one change to a design of a user interface (for example, to the first version of the design of the user interface of step 702), for example as described above in relation to step 510 (for example, where using step 510 where the portion of the design is the entire design). The at least one change may be associated with a level.

In some examples, step 710 may comprise implementing at least one change (such as the at least one change determined by step 708) to generate a second version of the design of the user interface, for example as described above in relation to step 512. The second version may be associated with a level (such as the level of step 708).

In some examples, step 712 may comprise causing a second presentation of a user interface (such as the user interface of step 702) to an individual (such as the individual of step 704 and/or step 706), for example as described above in relation to step 514. The second presentation may be based on a design of a user interface (such as the second version of the design generated by step 710). In some examples, step 718 may comprise causing a third presentation of a user interface (such as the user interface of step 702) to an individual (such as the individual of step 704 and/or step 706), for example as described above in relation to step 514. The third presentation may be based on a design of a user interface (such as the third version of the design generated by step 716).

In some examples, step 716 may comprise analyzing a textual input and/or a sketch to generate a new version of a design of a user interface. The design of the user interface may be (previously and/or originally) associated with a level (such as the level of step 708 and/or step 710), and the new version may be associated with an adjusted level. For example, step 716 may comprise analyzing the second textual input received by step 714 and/or the second sketch received by step 714 to generate a third version of the design of the user interface of step 702. The third version may be associated with an adjusted level. In one example, step 716 may use a machine learning model to analyze the second textual input and/or the second sketch and/or additional information to generate the new version of the design of the user interface associated with the adjusted level. The machine learning model may be a machine learning model trained using training examples to generate new versions of designs of user interfaces associated with adjusted levels based on texts and/or sketches and/or additional information. An example of such training example may include a sample design of a sample user interface associated with a level and/or a sample textual input and/or a sample sketch and/or sample additional information, together with a sample new design of the sample user interface associated with an adjusted level. In one example, the analyzing the second textual input to generate the third version of the design of the user interface by step 716 may include analyzing the first textual input and the second textual input to generate the third version of the design of the user interface. For example, step 716 may use the machine learning model with the first textual input as the additional information. In one example, the analyzing the second textual input to generate the third version of the design of the user interface by step 716 may include analyzing the first version of the design of step 702 and/or the second version of the design generated by step 710 and/or the second textual input to generate the third version of the design of the user interface. For example, step 716 may use the machine learning model with the first version of the design of step 702 and/or the second version of the design generated by step 710 as the additional information.

In some examples, step 716 may identify a first mathematical object in a mathematical space, wherein the first mathematical object corresponds to a word of the first textual input, for example using module 302. Further, step 716 may identify a second mathematical object in the mathematical space, wherein the second mathematical object corresponds to a word of the second textual input, for example using module 302. Further, step 716 may calculate a function of the first mathematical object and the second mathematical object to obtain a third mathematical object in the mathematical space, for example using module 304. Further, step 716 may base the generation of the third version of the design of the user interface on the third mathematical object. For example, the adjusted level may be based on the third mathematical object. In another example, step 716 may use a generative model to generate the third version, and may use the third mathematical object as a seed for the generative model.

In some examples, step 716 may identify a first mathematical object in a mathematical space, wherein the first mathematical object corresponds to a first word of the second textual input, for example using module 302. Further, step 716 may identify a second mathematical object in the mathematical space, wherein the second mathematical object corresponds to a second word of the second textual input, for example using module 302. Further, step 716 may calculate a function of the first mathematical object and the second mathematical object to obtain a third mathematical object in the mathematical space, for example using module 304. Further, step 716 may base the generation of the third version of the design of the user interface on the third mathematical object. For example, the adjusted level may be based on the third mathematical object. In another example, step 716 may use a generative model to generate the third version, and may use the third mathematical object as a seed for the generative model.

In some examples, the second textual input received by step 714 may include an adjective. Further, step 716 may determine whether to increase or decrease the level based on the adjective. For example, when the second textual input includes 'That's too massive', step 716 may determine to increase the level, and when the second textual input includes 'That's too tiny', step 716 may determine to decrease the level. In some examples, the second textual input received by step 714 may include a verb. Further, step 716 may determine whether to increase or decrease the level based on the verb. For example, when the second textual input includes 'Push the boundaries', step 716 may determine to increase the level, and when the second textual input includes 'Respect the boundaries', step 716 may determine to decrease the level.

In some examples, the at least one change determined by step 708 may be associated with an additional level. Further, step 716 may analyze the second textual input and/or the second sketch to determine whether to adjust the additional level. For example, step 716 may use a LLM to analyze the second textual input and/or the second sketch to determine whether to adjust the additional level. Further, step 716 may base the generation of the third version of the design of the user interface on the determination of whether to adjust the additional level. For example, when the determination is to adjust the additional level, the third version may be associated with the adjusted level and an adjusted additional level, and when the determination is not to adjust the additional level, the third version may be associated with the adjusted level and the additional level. In one example, the second textual input may include an adjective and the determination by step 716 of whether to adjust the additional level may be based on the adjective. For example, the at least one change determined by step 708 may be associated with a high pink level and a high softness level, when the second textual input includes 'That's too pink', the third version of the design may be associated with a lower level of pink and the same level of softness, and when the second textual input includes 'That's too feminine', the third version of the design may be associated with a lower level of pink and a lower level of softness. In one example, the second textual input may include a noun and the determination by step 716 of whether to adjust the additional level may be based on the noun. For example, the at least one change determined by step 708 may include enlarging a button and changing a background color to a darker shade of blue, when the second textual input includes 'The button is too much', the third version of the design may include a smaller button and a background with the same shade of blue, and when the second textual input includes 'Everything is too much', the third version of the design may include a smaller button and a background with a lighter shade of blue.

In some examples, step 712 may further comprise presenting an indication of the level with the second presentation, and step 718 may further comprise presenting an indication of the adjusted level with the third presentation. An indication of a level and/or of an adjusted level may include a visual indication, an audible indication, a textual indication, a numerical indication, a graphical indication, and so forth.

In some examples, step 708 may further comprise analyzing the first textual input to determine a numerical value associated with the level. For example, step 708 may use a LLM to analyze the first textual input to determine the numerical value associated with the level. In some examples, step 716 may further comprise analyzing the second textual input and/or the numerical value associated with the level to determine a numerical value associated with the adjusted level. For example, step 716 may use a LLM to analyze the second textual input and/or the numerical value associated with the level to determine the numerical value associated with the adjusted level. In one example, step 716 may use a machine learning model to analyze the second textual input and the numerical value associated with the level to determine the numerical value associated with the adjusted level. The machine learning model may be a machine learning model trained using training examples to determine adjusted levels based on original levels and/or text. An example of such training example may include a sample textual input and a sample numerical value of a sample level, together with a label indicative of a numerical value of a sample adjusted level. In one example, step 716 may identify a first mathematical object in the mathematical space, wherein the second mathematical object may correspond to a word of the second textual input, for example using module 302. Further, step 716 may calculate a function of the first mathematical object and the numerical value associated with the level to obtain a second mathematical object in the mathematical space, for example using module 304. Further, step 716 may determine the numerical value associated with the adjusted level based on the second mathematical object. For example, the numerical value associated with the adjusted level may be a function of the second mathematical object. In another example, step 716 may determine the numerical value associated with the adjusted level based on a function of the first mathematical object and the numerical value associated with the level.

In some examples, the level of method 700 may be associated with a particular color. For example, the first textual input received by step 706 may include 'Let's make this female friendly', the at least one change determined by step 708 may be associated with a high level of pink, the second textual input received by step 714 may include 'That's too much', and the third version of the design may be associated with a lower level of pink. In some examples, the level of method 700 may be associated with a gender. For example, the first textual input received by step 706 may include 'I want it to communicate masculinity', the at least one change determined by step 708 may be associated with a high level of masculinity, the second textual input received by step 714 may include 'That's exaggerated', and the third version of the design may be associated with a lower level of masculinity. In some examples, the level of method 700 may be associated with a density. For example, the first textual input received by step 706 may include 'Let's provide all the details', the at least one change determined by step 708 may be associated with a high density level, the second textual input received by step 714 may include 'Too cluttered', and the third version of the design may be associated with a lower density level. In some examples, the level of method 700 may be associated with a distance between two elements of the user interface. For example, the first textual input received by step 706 may include 'Let's put the Send and Cancel buttons together', the at least one change determined by step 708 may put the two buttons very close to each other, the second textual input received by step 714 may include 'We need some space between them', and the third version of the design may include a wider distance between the two buttons. In some examples, the level of method 700 may be associated with a font size used to present textual content in the user interface. For example, the first textual input received by step 706 may include 'Let's present the background story', the at least one change determined by step 708 may be associated with a small font size, the second textual input received by step 714 may include 'It's not readable', and the third version of the design may be associated with a larger font size. In some examples, the level of method 700 may be associated with an emotion. For example, the first textual input received by step 706 may include 'Here we are giving good news', the at least one change determined by step 708 may be associated with a high level of excitement (for example, may include dynamic compositions, energetic colors, and/or images of action or movement), the second textual input received by step 714 may include 'That's too much', and the third version of the design may be associated with a lower level of excitement. In some examples, the level of method 700 may be associated with a visual content presented in the user interface. For example, user interface may be designed for an augmented reality environment, the first textual input received by step 706 may include 'Let's present the floor plan while the person is walking in the building', the at least one change determined by step 708 may be associated with a high opacity level, the second textual input received by step 714 may include 'This hides the surroundings', and the third version of the design may be associated with a lower opacity level. In another example, the level may be associated with a size of the visual content. In yet another example, the level may be associated with an object depicted in the visual content.

In some examples, method 700 may further comprise halting the second presentation of the user interface (caused by step 712), for example before, after or simultaneously with step 718. Further, after halting the second presentation of the user interface and presenting the third presentation using step 718, method 700 may further comprise receiving from the individual a third textual input in the natural language, for example as described above in relation to step 402. The third textual input may be associated with a desire of the individual to undo the adjustment. Further, in response to the third textual input, method 700 may halt the third presentation and/or may resume the presentation of the user interface based on the second version of the design generated by step 710. For example, the second presentation may be resumed. In another example, resuming the presentation of the user interface based on the second version of the design generated by step 710 may include using step 712 to cause a new presentation of the user interface based on the second version of the design generated by step 710.

In some examples, method 700 may further comprise receiving from the individual a third textual input in the natural language, for example as described above in relation to step 402. The third textual input may be associated with a desire of the individual to moderate the adjustment. Further, method 700 may further comprise analyzing the third textual input to generate a fourth version of the design of the user interface, for example using a machine learning model as described above in relation to step 716. The fourth version may be associated with an intermediate level between the level and the adjusted level. Further, method 700 may further comprise causing a fourth presentation of a user interface (such as the user interface of step 702) to an individual (such as the individual of step 704 and/or step 706 and/or step 718), for example as described above in relation to step 514. The fourth presentation may be based on the generated fourth version of the design.

In some examples, method 700 may further comprise receiving from the individual a third textual input in the natural language, for example as described above in relation to step 402. The third textual input may be associated with a desire of the individual to intensify the adjustment. Further, method 700 may further comprise analyzing the third textual input to generate a fourth version of the design of the user interface, for example using a machine learning model as described above in relation to step 716. The fourth version may be associated with a new adjusted level, and the adjusted level may be between the level and the new adjusted level. Further, method 700 may further comprise causing a fourth presentation of a user interface (such as the user interface of step 702) to an individual (such as the individual of step 704 and/or step 706 and/or step 718), for example as described above in relation to step 514. The fourth presentation may be based on the generated fourth version of the design.

FIG. 8A is a flowchart of an exemplary method 800 for hyper personalization of user interfaces, consistent with some embodiments of the present disclosure. In this example, method 800 may comprise receiving from a particular individual a textual input in a natural language and/or a sketch, the textual input and/or the sketch are associated with a desire of the particular individual to affect a design of a user interface (step 802); obtaining first digital data associated with a first individual (step 804); using the first digital data, the textual input and/or the sketch to generate a first version of the design of the user interface (step 806); transmitting first digital signals to a first computing device associated with the first individual, the first digital signals are configured to cause the first computing device to present the user interface based on the first version of the design (step 808); obtaining second digital data associated with a second individual, the second digital data differs from the first digital data (step 810); using the second digital data, the textual input and/or the sketch to generate a second version of the design of the user interface, the second version differs from the first version (step 812); and transmitting second digital signals to a second computing device associated with the second individual, the second digital signals are configured to cause the second computing device to present the user interface based on the second version of the design (step 814). In other examples, method 800 may include additional steps or fewer steps. In other examples, one or more steps of method 800 may be executed in a different order and/or one or more groups of steps may be executed simultaneously.

In some examples, step 802 may comprise receiving from a particular individual a textual input in a natural language and/or a sketch, for example as described above in relation to step 402. The textual input and/or the sketch may be associated with a desire of the particular individual to affect a design of a user interface.

In some examples, digital data associated with an individual may be obtained. For example, step 804 may comprise obtaining first digital data associated with a first individual. In another example, step 810 may comprise obtaining second digital data associated with a second individual. In one example, the second digital data may differ from the first digital data. Obtaining the digital data may comprise reading the digital data from memory (for example, from memory 210), may comprise receiving the digital data from an external computing device (for example, using a digital communication device, from the first computing device of step 808, from the second computing device of step 814, from a different computing device, etc.), may comprise generating the digital data (for example, based on other information, based on behavior of the individual, based on a user profile, etc.), may comprise receiving the digital data from an individual (for example, from the particular individual of step 802, from the first individual of step 804, from the second individual of step 810, from a different individual, via a user interface, etc.), and so forth.

In some examples, a textual data that includes a description in the natural language of at least one characteristic of an individual may be received, for example as described above in relation to step 402. Further, the textual data may be analyzed to determine the digital data associated with the individual, for example using a LLM. The digital data associated with an individual may be based on the at least one characteristic of the first individual. For example, step 804 may comprise receiving first textual data, wherein the first textual data may include a description in the natural language of at least one characteristic of the first individual, and analyzing the first textual data to determine the first digital data, wherein the first digital data may be based on the at least one characteristic of the first individual. Further, step 810 may comprise receiving second textual data, wherein the second textual data may include a description in the natural language of at least one characteristic of the second individual, and analyzing the second textual data to determine the second digital data, wherein the second digital data may be based on the at least one characteristic of the second individual. In one example, the first textual data may include 'Young adult that loves rock concerts', the second textual data may include 'Elderly woman that loves vintage sport cars', the first digital data may be indicative of the age group and affinity to rock concerts, and the second digital data may be indicative of the age group, the gender and the affinity to vintage sport cars. In one example, the textual data associated with the individual may be obtained from social media, from an online profile, from a personnel file, and so forth.

In some examples, it may be determined that an individual is associated with a population segment. Further, a data-structure associating population segments with digital records may be accessed based on the population segment to obtain the digital data associated with the individual. For example, step 804 may determine that the first individual may be associated with a first population segment, and may access the data-structure based on the first population segment to obtain the first digital data. In another example, step 810 may determine that the second individual may be associated with a second population segment, wherein the second population segment may differ from the first population segment, and may access the data-structure based on the second population segment to obtain the second digital data. For example, the first individual may be a Knicks fan, and therefore step 804 may obtain digital data associated with Knicks fans, while the second individual may be a Cavs fan, and therefore step 810 may obtain digital data associated with Cavs fans.

In some examples, a textual input and/or a sketch and/or digital data associated with an individual may be used to generate a version of a design of a user interface. For example, step 806 may use the textual input received by step 802 and/or the sketch received by step 802 and/or the first digital data obtained by step 804 to generate a first version of the design of the user interface of step 802. In another example, step 812 may use the textual input received by step 802 and/or the sketch received by step 802 and/or the second digital data obtained by step 810 to generate a second version of the design of the user interface of step 802. The second version may differ from the first version. In one example, a machine learning model may be used to analyze the textual input and/or the sketch and/or the digital data to generate the version of the design of the user interface. The machine learning model may be a machine learning model trained using training examples to generate versions of designs of user interfaces based on texts and/or sketches and/or data associated with individuals and/or additional information. An example of such training example may include a sample textual input and/or a sample sketch and/or a sample data associated with a sample individual and/or sample additional information, together with a sample version of a design of a sample user interface. In one example, the machine learning model may be a multimodal machine learning model. In one example, step 806 may use the machine learning model to analyze the textual input received by step 802 and/or the sketch received by step 802 and/or the first digital data obtained by step 804 to generate the first version of the design of the user interface. Further, step 812 may use the machine learning model to analyze the textual input received by step 802 and/or the sketch received by step 802 and/or the second digital data obtained by step 810 to generate the second version of the design of the user interface.

In some examples, the textual input received by step 802 may include a noun. Further, step 806 may include a first element of a particular type in the first version of the design of the user interface based on the noun and the first digital data, and step 812 may include a second element of the particular type in the second version of the design of the user interface based on the noun and the second digital data. For example, step 806 may use a LLM to analyze the textual input that includes the noun and a textual representation of the first digital data to select and/or generate the first element, and step 812 may use a LLM to analyze the textual input that includes the noun and a textual representation of the second digital data to select and/or generate the second element. In one example, the textual input may include either 'Provide the user an ability to update the status' or 'Provide the user an ability to update the color', the particular type may be a control, the first digital data may indicate a preference of radio buttons over dropdown menus, the first version of the design may include a radio button for updating either the status or the color, the second digital data may indicate a preference of dropdown menus over radio buttons, and the second version of the design may include a dropdown menu for updating the status or the color.

In some examples, the textual input received by step 802 may include a pronoun. Further, step 806 may include a first element of a particular type in the first version of the design of the user interface based on the pronoun and the first digital data, and step 812 may include a second element of the particular type in the second version of the design of the user interface based on the pronoun and the second digital data. For example, step 806 may use a LLM to analyze the textual input that includes the pronoun and a textual representation of the first digital data to select and/or generate the first element, and step 812 may use a LLM to analyze the textual input that includes the pronoun and a textual representation of the second digital data to select and/or generate the second element. In one example, the textual input may include either 'Provide the user an ability to update his status' or 'Provide the user an ability to update the her status', the particular type may be a control, the first digital data may indicate a preference of radio buttons over dropdown menus, the first version of the design may include a radio button for updating either his or her status, the second digital data may indicate a preference of dropdown menus over radio buttons, and the second version of the design may include a dropdown menu for updating either his or her status.

In some examples, the textual input received by step 802 may include a verb. Further, step 806 may include a first animation of a particular type in the first version of the design of the user interface based on the verb and the first digital data, and step 812 may include a second animation of the particular type in the second version of the design of the user interface based on the verb and the second digital data.

For example, step 806 may use a LLM to analyze the textual input that includes the verb and a textual representation of the first digital data to select and/or generate the first animation, and step 812 may use a LLM to analyze the textual input that includes the verb and a textual representation of the second digital data to select and/or generate the second animation. In one example, the textual input may include either 'Quiver the notification to draw attention to it' or 'Flicker the notification to draw attention to it', each one of the first digital data and the second digital data may indicate an affinity to different parameters of flickering (such as different degrees of brightness) and to different parameters of quivering (such as a different frequency), and the first and second versions of the design may include either quivering or flickering animation based on the verb, with a characteristic (such as brightness or frequency) selected based on the corresponding digital data.

In some examples, the textual input received by step 802 may include an adverb. Further, step 806 may include a first animation of a particular type in the first version of the design of the user interface based on the adverb and the first digital data, and step 812 may include a second animation of the particular type in the second version of the design of the user interface based on the adverb and the second digital data. For example, step 806 may use a LLM to analyze the textual input that includes the adverb and a textual representation of the first digital data to select and/or generate the first animation, and step 812 may use a LLM to analyze the textual input that includes the adverb and a textual representation of the second digital data to select and/or generate the second animation. In one example, the textual input may include either 'Slowly move the notification to the designated area' or 'Quickly move the notification to the designated area', each one of the first digital data and the second digital data may indicate an affinity to a different range of speed of motion, and the first and second versions of the design may include moving the notification to the designated area at a speed of the low or high end of the corresponding range.

In some examples, the textual input received by step 802 may include a preposition. Further, step 806 may select a location for a selected element in the first version of the design of the user interface based on the preposition and the first digital data, and step 812 may select a different location for the selected element in the second version of the design of the user interface based on the preposition and the second digital data. For example, step 806 may use a LLM to analyze the textual input that includes the preposition and a textual representation of the first digital data to select the location in the first version, and step 812 may use a LLM to analyze the textual input that includes the preposition and a textual representation of the second digital data to select the location in the second version. In one example, the textual input may include either 'Put the status above the notifications' or 'Put the status below the notifications', each one of the first digital data and the second digital data may indicate an affinity to a different particular distance between elements, and the first and second versions of the design may include locating the status either above or below the notification at the corresponding particular distance from the notification.

In some examples, the textual input received by step 802 may include a preposition. Further, step 806 may select a timing for a selected animation in the first version of the design of the user interface based on the preposition and the first digital data, and step 812 may select a different timing for the selected animation in the second version of the design of the user interface based on the preposition and the second digital data. For example, step 806 may use a LLM to analyze the textual input that includes the preposition and a textual representation of the first digital data to select the timing in the first version, and step 812 may use a LLM to analyze the textual input that includes the preposition and a textual representation of the second digital data to select the timing in the second version. In one example, the textual input may include either 'Show the first animation after the second animation' or 'Show the first animation before the second animation', each one of the first digital data and the second digital data may indicate an affinity to a different particular duration between animations, and the first and second versions of the design may include showing the first animation either after or before the second animation with the particular duration between them.

In some examples, the textual input received by step 802 may include an adjective. Further, step 806 may select a color scheme for the first version of the design of the user interface based on the adjective and the first digital data, and step 812 may select a different color scheme for the second version of the design of the user interface based on the adjective and the second digital data. For example, step 806 may use a LLM to analyze the textual input that includes the adjective and a textual representation of the first digital data to select the color scheme for the first version, and step 812 may use a LLM to analyze the textual input that includes the adjective and a textual representation of the second digital data to select the color scheme for the second version. In one example, the textual input may include either 'Use shiny colors' or 'Use matte colors', the first digital data may indicate an affinity to blue, the color scheme for the first version of the design may include either shiny or matte shade of blue based on the adjective, the second first digital data may indicate an affinity to green, and the color scheme for the first version of the design may include either shiny or matte shade of green based on the adjective.

In some examples, the textual input received by step 802 may include an adjective. Further, step 806 may select a size for a selected element in the first version of the design of the user interface based on the adjective and the first digital data, and step 812 may select a different size for the selected element in the second version of the design of the user interface based on the adjective and the second digital data. For example, step 806 may use a LLM to analyze the textual input that includes the adjective and a textual representation of the first digital data to select the size of the selected element in the first version, and step 812 may use a LLM to analyze the textual input that includes the adjective and a textual representation of the second digital data to select the size of the selected element in the second version. In one example, the textual input may include either 'We need an enormous status indicator' or 'We need a tiny status indicator', each one of the first digital data and the second digital data may indicate an affinity to a different range of sizes of indicators, and the first and second versions of the design may include a status indicator in a size either at the low or high end of the corresponding range.

In some examples, the textual input received by step 802 may include an adjective. Further, step 806 may select a visual filter for a selected element in the first version of the design of the user interface based on the adjective and the first digital data, and step 812 may select a different visual filter for the selected element in the second version of the design of the user interface based on the adjective and the second digital data. For example, step 806 may use a LLM to analyze the textual input that includes the adjective and a textual representation of the first digital data to select the visual filter for the first version, and step 812 may use a LLM to analyze the textual input that includes the adjective and a textual representation of the second digital data to select the visual filter for the second version. In one example, the textual input may include either 'Show my picture with a vintage filter' or 'Show my picture with a dreamy filter', each one of the first digital data and the second digital data may indicate affinity to different parameters of different filters, and the first and second versions of the design may include the picture with either vintage or dreamy filter with the corresponding parameters.

In some examples, the textual input received by step 802 may include a conjunction. Further, step 806 may select a spatial relation between two selected elements in the first version of the design of the user interface based on the conjunction and the first digital data, and step 812 may select a different spatial relation between the two selected elements in the second version of the design of the user interface based on the conjunction and the second digital data. For example, step 806 may use a LLM to analyze the textual input that includes the conjunction and a textual representation of the first digital data to select the spatial relation in the first version, and step 812 may use a LLM to analyze the textual input that includes the conjunction and a textual representation of the second digital data to select the spatial relation in the second version.

In some examples, the textual input received by step 802 may include a conjunction. Further, step 806 may select a temporal relation between two selected events in the first version of the design of the user interface based on the conjunction and the first digital data, and step 812 may select a different temporal relation between the two selected events in the second version of the design of the user interface based on the conjunction and the second digital data. For example, step 806 may use a LLM to analyze the textual input that includes the conjunction and a textual representation of the first digital data to select the temporal relation in the first version, and step 812 may use a LLM to analyze the textual input that includes the conjunction and a textual representation of the second digital data to select the temporal relation in the second version.

In some examples, the first digital data obtained by step 804 may include an indication of a first physical location associated with the first individual, and the second digital data obtained by step 810 may include an indication of a second physical location associated with the second individual. Further, the generation of the first version of the design of the user interface by step 806 may be based on the textual input received by step 802 and/or the sketch received by step 802 and/or the first physical location, and the generation of the second version of the design of the user interface by step 812 based on the textual input received by step 802 and/or the sketch received by step 802 and/or the second physical location, for example using the machine model described above. For example, the textual input may include 'Show popular dishes', the first physical location may be in China, the first version of the design may include a background image of a dim sum dish, the second physical location may be in France, and the second version of the design may include a background image of macarons. In another example, the sketch may include an empty flag, the first physical location may be in California, the first version of the design may include an image of the flag of the USA, the second physical location may be in Toronto, and the second version of the design may include an image of the flag of Canada. In some examples, the first and second physical locations may correspond to the geographical locations of the first and second individuals, respectively. In some examples, the first and second physical locations may correspond to geographical destinations (such as travel destinations, vacation destinations, etc.), to address (such as home addresses, work addresses, etc.), to birthplaces, to hometowns, to historical sites of accomplishments, to favorite spots, and so forth.

In some examples, the first digital data obtained by step 804 may include an indication of a demographic characteristic of the first individual, the second digital data obtained by step 810 may include an indication of a demographic characteristic of the second individual. Further, the generation of the first version of the design of the user interface by step 806 may be based on the textual input received by step 802 and/or the sketch received by step 802 and/or the demographic characteristic of the first individual, and the generation of the second version of the design of the user interface by step 812 based on the textual input received by step 802 and/or the sketch received by step 802 and/or the demographic characteristic of the second individual, for example using the machine model described above. For example, the textual input may include 'Use compelling images', the demographic characteristic of the first individual may be 'teen', the first version of the design may include a background image of vibrant street art, the demographic characteristic of the second individual may be 'elderly', and the second version of the design may include a background image of serene nature scene. In another example, the sketch may include a visualization of two generic persons walking, the demographic characteristic of the first individual may be 'teen', the first version of the design may include an image of two teens walking, the demographic characteristic of the second individual may be 'elderly', and the second version of the design may include an image of a teen and an elderly person walking. In some examples, the demographic characteristics of the first and second individuals may correspond to age group, gender, ethnicity, nationality, religion, socioeconomic status, education level, marital status, family structure, primary language, spoken languages, health status, and so forth.

In some examples, the first digital data obtained by step 804 may include an indication of a first action associated with the first individual, and the second digital data obtained by step 810 may include an indication of a second action associated with the second individual. Further, the generation of the first version of the design of the user interface by step 806 may be based on the textual input received by step 802 and/or the sketch received by step 802 and/or the first action, and the generation of the second version of the design of the user interface by step 812 based on the textual input received by step 802 and/or the sketch received by step 802 and/or the second action. For example, the textual input may include 'Show visuals of interest to the viewer', the first action may be 'searched for a cruise', the first version of the design may include a background image of a sailing cruise ship, the second action may be 'bought ski goggles', and the second version of the design may include a background image of a ski resort. In another example, the sketch may include a visualization of a generic person, the first action may be 'searched for a cruise', the first version of the design may include an image of a man in Hawaiian shirt, the second action may be 'bought ski goggles', and the second version of the design may include an image of a man in ski gear. In some examples, the first and second action may be different actions in a virtual environment, may be different digital actions, may be different actions in the physical world, may be different verbal actions, may be different cognitive actions, may be different social actions, may be different creative actions, may be different professional actions, may be different recreational actions, may be different educational actions, and so forth.

In some examples, the first digital data obtained by step 804 may include an indication of a first behavior pattern associated with the first individual, and the second digital data obtained by step 810 may include an indication of a second behavior pattern associated with the second individual. Further, the generation of the first version of the design of the user interface by step 806 may be based on the textual input received by step 802 and/or the sketch received by step 802 and/or the first behavior pattern, and the generation of the second version of the design of the user interface by step 812 based on the textual input received by step 802 and/or the sketch received by step 802 and/or the second behavior pattern. For example, the textual input may include 'Show people in a restaurant' and/or the sketch may include a generic group of people sitting in a generic restaurant, the first behavior pattern may be 'active in morning hours', the first version of the design may include an image of people in a restaurant eating breakfast during daylight hours, the second behavior pattern may be 'active in late night hours', and the second version of the design may include an image of people in a restaurant eating supper during nighttime. In some examples, the first and second behavior patterns may be different social behavior patterns, may be different communication behavior patterns, may be different cognitive behavior patterns, may be different online behavior patterns, may be different behavior patterns in the physical world, and so forth.

In some examples, the first digital data obtained by step 804 may include an indication of a first virtual location associated with the first individual, and the second digital data obtained by step 810 may include an indication of a second virtual location associated with the second individual. Further, the generation of the first version of the design of the user interface by step 806 may be based on the textual input received by step 802 and/or the sketch received by step 802 and/or the first virtual location, and the generation of the second version of the design of the user interface by step 812 based on the textual input received by step 802 and/or the sketch received by step 802 and/or the second virtual location. For example, the textual input may include 'Show a logo of an HMO' and/or the sketch may include a generic logo of a generic HMO, the first virtual location may include a website of a first HMO that the first individual visited, the first version of the design may include a logo of the first HMO, the second virtual location may include a website of a second HMO that the second individual visited, the second version of the design may include a logo of the second HMO. In some examples, the first and second virtual locations may be different websites, may be different virtual places in an extended reality environment, may be different virtual conference calls, and so forth.

In some examples, the first digital data obtained by step 804 may include an indication of a first natural language associated with the first individual, and the second digital data obtained by step 810 may include an indication of a second natural language associated with the second individual. Further, the generation of the first version of the design of the user interface by step 806 may be based on the textual input received by step 802 and/or the sketch received by step 802 and/or the first natural language, and the generation of the second version of the design of the user interface by step 812 based on the textual input received by step 802 and/or the sketch received by step 802 and/or the second natural language. For example, the textual input and/or the sketch may indicate a layout, the first natural language may be English, the first version of the design may include the layout arranged from left to right, the second natural language may be Hebrew, and the second version of the design may include the layout arranged from right to left. In some examples, the first and second natural languages may be different languages spoken by the respective individuals, may be different native languages of the respective individuals, may be different second languages of the respective individuals, may be different heritage languages of the respective individuals, and so forth.

In some examples, the first digital data obtained by step 804 may include an indication of a first social group associated with the first individual, and the second digital data obtained by step 810 may include an indication of a second social group associated with the second individual. Further, the generation of the first version of the design of the user interface by step 806 may be based on the textual input received by step 802 and/or the sketch received by step 802 and/or the first social group, and the generation of the second version of the design of the user interface by step 812 based on the textual input received by step 802 and/or the sketch received by step 802 and/or the second social group. For example, the textual input may include 'Show religious icons', the first social group may be a congregation of a protestant church, the first version of the design may include Christian icons, the second social group may be a student body of a Talmud Torah, and the second version of the design may include Jewish icons. In some examples, the first and second social groups may be different family groups, may be friendship groups, may be different educational groups, may be different workplace groups, may be different cultural groups, may be different religious groups, may be different recreational groups, may be different online communities, may be different professional organizations, may be different support groups, may be different political groups, may be different generational groups, and so forth.

In some examples, step 806 may analyze the first digital data received by step 804 to identify a first mathematical object in a mathematical space, for example using module 306. Further, step 812 may analyze the second digital data received by step 810 to identify a second mathematical object in the mathematical space, for example using module 306. Further, a third mathematical object in the mathematical space may be identified, wherein the third mathematical object corresponds to a word of the textual input received by step 802, for example using module 302. Further, step 806 may calculate a function of the first mathematical object and the third mathematical object to obtain a fourth mathematical object in the mathematical space, for example using module 304. Further, step 806 may base the generation of the first version of the design of the user interface on the fourth mathematical object. For example, step 806 may use a generative model to generate the first version of the design, and may use the fourth mathematical object as a seed or an input to the generative model. Further, step 810 may calculate a function of the second mathematical object and the third mathematical object to obtain a fifth mathematical object in the mathematical space, for example using module 304. Further, step 810 may base the generation of the second version of the design of the user interface on the fifth mathematical object. For example, step 810 may use a generative model to generate the second version of the design, and may use the fifth mathematical object as a seed or an input to the generative model.

In some examples, a convolution of at least part of the pixel values of the sketch received by step 802 may be calculated to obtain a result value. Further, step 806 may analyze the first digital data received by step 804 to identify a first mathematical object in a mathematical space, for example using module 306. Further, step 812 may analyze the second digital data received by step 810 to identify a second mathematical object in the mathematical space, for example using module 306. Further, step 806 may calculate a function of the result value and the first mathematical object to obtain a third mathematical object in the mathematical space, for example using module 304. Further, step 806 may base the generation of the first version of the design of the user interface on the third mathematical object. For example, step 806 may use a generative model to generate the first version of the design, and may use the third mathematical object as a seed or an input to the generative model. Further, step 810 may calculate a function of the result value and the second mathematical object to obtain a fourth mathematical object in the mathematical space, for example using module 304. Further, step 810 may base the generation of the second version of the design of the user interface on the fourth mathematical object. For example, step 810 may use a generative model to generate the second version of the design, and may use the fourth mathematical object as a seed or an input to the generative model.

In some examples, a convolution of at least part of the pixel values of the sketch received by step 802 may be calculated to obtain a result value. Further, step 806 may analyze the first digital data received by step 804 to identify a first mathematical object in a mathematical space, for example using module 306. Further, step 812 may analyze the second digital data received by step 810 to identify a second mathematical object in the mathematical space, for example using module 306. Further, a third mathematical object in the mathematical space may be identified, wherein the third mathematical object corresponds to a word of the textual input received by step 802, for example using module 302. Further, step 806 may calculate a function of the result value, the first mathematical object and the third mathematical object to obtain a fourth mathematical object in the mathematical space, for example using module 304. Further, step 806 may base the generation of the first version of the design of the user interface on the fourth mathematical object. For example, step 806 may use a generative model to generate the first version of the design, and may use the fourth mathematical object as a seed or an input to the generative model. Further, step 810 may calculate a function of the result value, the second mathematical object and the third mathematical object to obtain a fifth mathematical object in the mathematical space, for example using module 304. Further, step 810 may base the generation of the second version of the design of the user interface on the fifth mathematical object. For example, step 810 may use a generative model to generate the second version of the design, and may use the fifth mathematical object as a seed or an input to the generative model.

In some examples, digital signals may be transmitted to a computing device (for example, to a computing device associated with an individual). The digital signals may be configured to cause the computing device to present a user interface based on a version of the design. For example, step 808 may comprise transmitting first digital signals to a first computing device associated with the first individual of step 804. The first digital signals may be configured to cause the first computing device to present the user interface based on the first version of the design generated by step 806. In another example, step 814 may comprise transmitting second digital signals to a second computing device associated with the second individual of step 810. The second digital signals may be configured to cause the second computing device to present the user interface based on the second version of the design generated by step 812. In an additional example, step 912 may comprise transmitting first digital signals to a first computing device associated with the first individual of step 906, wherein the first digital signals may be configured to cause the first computing device to present the particular user interface of step 910 and/or step 918 based on the first version of the design of the particular user interface generated by step 910. In yet another example, step 920 may comprise transmitting second digital signals to a second computing device associated with the second individual of step 914, wherein the second digital signals may be configured to cause the second computing device to present the particular user interface of step 910 and/or step 918 based on the second version of the design of the particular user interface generated by step 918. In some examples, transmitting the digital signals may comprise using a digital communication device, such as communication module 230, to transmit the digital signals, for example via wired communication, via wireless communication, via a digital communication network (such as network 180). In some examples, the digital signals may encode the version of the design of the user interface and/or elements of the user interface in a digital format, for example in an HTML format and/or a CSS format and/or a source code in a style sheet language and/or media files. In some examples, the digital signals may be generated based on the version of the design, for example using a generative model.

In some examples, method 800 may further comprise analyzing the textual input received by step 802 and/or the sketch received by step 802 to generate a base version of the design of the user interface, for example using method 400 and/or step 404 and/or step 406 and/or step 408. Further, method 800 may further comprise causing a presentation to the particular individual of the user interface based on the base version of the design, for example using module 308. In some examples, step 806 may use the base version of the design and the first digital data received by step 804 to generate the first version of the design of the user interface. For example, step 806 may use the machine learning model described above in relation to step 806 and step 812 with the base version of the design as the additional information to analyze the base version of the design and the first digital data to generate the first version of the design of the user interface. Further, step 812 may use the base version of the design and the second digital data received by step 810 to generate the second version of the design of the user interface. For example, step 812 may use the machine learning model described above in relation to step 806 and step 812 with the base version of the design as the additional information to analyze the base version of the design and the second digital data to generate the second version of the design of the user interface. In some examples, method 800 may further comprise receiving third digital data associated with a preliminary version of the design of the user interface, for example as described above in relation to step 502. Further, method 800 may further comprise analyzing the textual input received by step 802 and/or the sketch received by step 802 to determine at least one change to the preliminary version of the design of the user interface, for example as described above in relation to step 510 and/or step 708. Further, method 800 may further comprise implementing the determined at least one change to generate the base version of the design of the user interface, for example as described above in relation to step 512 and/or step 710.

In some examples, the second version of the design of the user interface generated by step 812 may differ from the first version of the design of the user interface generated by step 806 in at least one visual content. For example, in a background image, in a hero image, in a still image, a video clip, and so forth. In some examples, the second version of the design of the user interface generated by step 812 may differ from the first version of the design of the user interface generated by step 806 in at least a layout of elements of the user interface. In some examples, the second version of the design of the user interface generated by step 812 may differ from the first version of the design of the user interface generated by step 806 in at least a distance between two elements of the user interface. In some examples, the second version of the design of the user interface generated by step 812 may differ from the first version of the design of the user interface generated by step 806 in at least a color scheme of at least part of the user interface. In some examples, the second version of the design of the user interface generated by step 812 may differ from the first version of the design of the user interface generated by step 806 in at least a size of at least one element of the user interface. In some examples, the second version of the design of the user interface generated by step 812 may differ from the first version of the design of the user interface generated by step 806 in at least a font used to present at least one textual content in the user interface.

FIG. 8B is a block diagram illustrating hyper-personalization of a user interface, consistent with some embodiments of the present disclosure. In this example, step 802 may receive textual input 850, 'Our objective is to accumulate a substantial number of positive reviews for our hotel while minimizing the occurrence of negative reviews'. Digital data associated with individuals 852 may have the structure of a two dimensional vector, with the first coordinate being the number of good reviews written by the individual and the second coordinate being the number of negative reviews written by the individual. In one example, first individual 862 may be an individual that tends to write good reviews, who wrote 52 good reviews and only one negative review, and the first digital data obtained by step 804 may be vector 864, (52, 1). Further, step 806 may generate a first version of the design of the user interface 866 with a review option in a central location for increasing the number of reviews. Further, second individual 872 may be an individual that tends to write negative reviews, who wrote only two good reviews and 13 negative reviews, and the second digital data obtained by step 810 may be vector 874, (2, 13). Further, step 812 may generate a second version of the design of the user interface 876 with a review option in a hidden location for decreasing the number of reviews.

FIG. 9 is a flowchart of an exemplary method 900 for learning to personalize user interfaces, consistent with some embodiments of the present disclosure. In this example, method 900 may comprise accessing historic digital experience records, each is associated with a digital experience of an individual with a user interface and a level of success (step 902); analyzing the historic digital experience records to determine a mathematical mapping of individuals to a mathematical space (step 904); receiving first digital data associated with a first individual (step 906); analyzing the first digital data using the mathematical mapping to identify a first mathematical object in the mathematical space (step 908); using the first mathematical object to generate a first version of a design of a particular user interface (step 910); transmitting first digital signals to a computing device associated with the first individual, to cause it to present the particular user interface based on the first version of the design (step 912); receiving second digital data associated with a second individual (step 914); analyzing the second digital data using the mathematical mapping to identify a second mathematical object in the mathematical space (step 916); using the second mathematical object to generate a second version of the design of the particular user interface (step 918); and transmitting second digital signals to a computing device associated with the second individual, to cause it to present the particular user interface based on the second version of the design (step 920). In other examples, method 900 may include additional steps or fewer steps. In other examples, one or more steps of method 900 may be executed in a different order and/or one or more groups of steps may be executed simultaneously.

In some examples, step 902 may comprise accessing a plurality of historic digital experience records. Each historic digital experience record of the plurality of historic digital experience records may be associated with an historic digital experience of a respective individual with a respective user interface and may associate a characteristic of the respective individual with a design of the respective user interface and an indication of a respective level of success. For example, accessing the plurality of historic digital experience records by step 902 may comprise reading the records from memory (such as memory 210), may comprise receiving the records from an external computing device (for example, using a digital communication device), may comprise generating the records (for example, based on the historic digital experiences, etc.), may be received from an individual (for example, via a user interface), and so forth. In some examples, for each historic digital experience record of the plurality of historic digital experience records accessed by step 902, the respective level of success may be indicative of whether the respective individual took a particular action using the respective user interface. In one example, the particular action may include entering a selected section of the user interface, may include entering selected data to the user interface, may include activating a selected functionality of the user interface, may include purchasing using the user interface, and so forth.

In some examples, step 904 may comprise analyzing a plurality of historic digital experience records (such as the plurality of historic digital experience records accessed by step 902) to determine a mathematical mapping of individuals to a mathematical space. Some non-limiting examples of such mathematical mappings may include a univariate mapping, a multivariate mapping, a linear function, a non-linear function, a polynomial function, an exponential function, a logarithmic function, a continuous function, a discontinuous function, a mathematical embedding algorithm, and so forth. In one example, the analyzing the plurality of historic digital experience records to determine the mathematical mapping by step 904 may include using an optimization scheme with an objective function based on the levels of success to determine the mathematical mapping. For example, step 904 may analyze the plurality of historic digital experience records and/or the levels of success to determine the objective function. In one example, the objective function may associate objects (such as mathematical objects in a second mathematical space, mathematical mappings, predictors, machine learning models, artificial neural networks, software functions, etc.) with values (such as a loss value, a score, etc.). Further, in one example, the using the optimization scheme may include performing steps to at least one of minimize or maximize the objective function by identifying an optimal object that minimize or maximize the objective function (or that corresponds to a local minima or maxima of the objective function). In another example, the using the optimization scheme may include, starting from a selected object that corresponds to a particular objective value based on the objective function, and performing steps to identify, based on the selected object and the objective function, objects that corresponds to a lower (or in a different scheme, higher) objective value based on the objective function. Some non-limiting examples of such optimization schemes may include gradient descent, coordinate descent, simulated annealing, genetic algorithms, and so forth. In one example, the objective function and the optimization scheme may be part of a machine learning model, and step 904 may train the machine learning model using the plurality of historic digital experience records and/or the levels of success to determine the objective function.

In some examples, step 904 may comprise receiving from a particular individual (for example, a particular individual different than the first and second individuals) a textual input (for example, a textual input in a natural language), for example as described above in relation to step 402. Further, step 904 may comprise analyzing the textual input and the plurality of historic digital experience records to determine the mathematical mapping. For example, step 904 may analyze the textual input to select an initial guess (for example, using a LLM, by selecting the initial guess from a preselected plurality of alternative initial guess, etc.), and may use an optimization scheme starting from the selected initial guess. In one example, the textual input may be indicative of a trait of individuals. For example, the textual input may include 'Let's show optimistic people a different background image', and the mathematical mapping determined by step 904 may be configured to output vectors that include a coordinate indicative of an optimism level of an individual. In one example, the textual input may be indicative of a characteristic of individuals. For example, the textual input may include 'Let's select the font size based on age', and the mathematical mapping determined by step 904 may be configured to output vectors that include a coordinate indicative of an age group of an individual.

In some examples, step 906 may comprise receiving first digital data associated with a first individual, for example as described above in relation to step 804. The first individual may not be associated with any one of the plurality of historic digital experience records accessed by step 902. In some examples, step 914 may comprise receiving second digital data associated with a second individual, for example as described above in relation to step 810. The second individual may not be associated with any one of the plurality of historic digital experience records accessed by step 902. The second individual differs from the first individual.

In some examples, digital data associated with an individual (such as the first digital data received by step 906, the second digital data received by step 914, etc.) may be analyzed using a mathematical mapping (for example, using the mathematical mapping determined by step 904) to identify a mathematical object in a mathematical space (such as the mathematical space of step 904). In one example, step 908 may comprise analyzing the first digital data received by step 906 using the mathematical mapping to identify a first mathematical object in the mathematical space. In another example, step 916 may comprise analyzing the second digital data received by step 914 using the mathematical mapping to identify a second mathematical object in the mathematical space. For example, the digital data may include a data-structure including data, and the mathematical mapping may be evaluated based on the included data to obtain the mathematical object in the mathematical space.

In some examples, the first digital data received by step 906 may include an indication of a first physical location associated with the first individual, and the second digital data received by step 914 may include an indication of a second physical location associated with the second individual. Further, the identification of the first mathematical object by step 908 may be based on the first physical location associated with the first individual, and the identification of the second mathematical object by step 916 may be based on the second physical location associated with the second individual. For example, at least one parameter of the mathematical mapping determined by step 904 may be a physical location associated with the individual. In some examples, the first and second physical locations may correspond to the geographical locations of the first and second individuals, respectively. In some examples, the first and second physical locations may correspond to geographical destinations (such as travel destinations, vacation destinations, etc.), to address (such as home addresses, work addresses, etc.), to birthplaces, to hometowns, to historical sites of accomplishments, to favorite spots, and so forth.

In some examples, the first digital data received by step 906 may include an indication of a demographic characteristic of the first individual, and the second digital data received by step 914 may include an indication of a demographic characteristic of the second individual. Further, the identification of the first mathematical object by step 908 may be based on the demographic characteristic of the first individual, and the identification of the second mathematical object by step 916 may be based on the demographic characteristic of the second individual. For example, at least one parameter of the mathematical mapping determined by step 904 may be a demographic characteristic associated with the individual. In some examples, the demographic characteristics of the first and second individuals may correspond to age group, gender, ethnicity, nationality, religion, socioeconomic status, education level, marital status, family structure, primary language, spoken languages, health status, and so forth.

In some examples, the first digital data received by step 906 may include an indication of an action associated with the first individual, and the second digital data received by step 914 may include an indication of an action associated with the second individual. Further, the identification of the first mathematical object by step 908 may be based on the action associated with the first individual, and the identification of the second mathematical object by step 916 may be based on the action associated with the second individual. For example, at least one parameter of the mathematical mapping determined by step 904 may be an action associated with the individual. In some examples, the first and second action may be different actions in a virtual environment, may be different digital actions, may be different actions in the physical world, may be different verbal actions, may be different cognitive actions, may be different social actions, may be different creative actions, may be different professional actions, may be different recreational actions, may be different educational actions, and so forth.

In some examples, the first digital data received by step 906 may include an indication of a behavior pattern associated with the first individual, and the second digital data received by step 914 may include an indication of a behavior pattern associated with the second individual. Further, the identification of the first mathematical object by step 908 may be based on the behavior pattern associated with the first individual, and the identification of the second mathematical object by step 916 may be based on the behavior pattern associated with the second individual. For example, at least one parameter of the mathematical mapping determined by step 904 may be a behavior pattern associated with the individual. In some examples, the first and second behavior patterns may be different social behavior patterns, may be different communication behavior patterns, may be different cognitive behavior patterns, may be different online behavior patterns, may be different behavior patterns in the physical world, and so forth.

In some examples, the first digital data received by step 906 may include an indication of a virtual location associated with the first individual, and the second digital data received by step 914 may include an indication of a virtual location associated with the second individual. Further, the identification of the first mathematical object by step 908 may be based on the virtual location associated with the first individual, and the identification of the second mathematical object by step 916 may be based on the virtual location associated with the second individual. For example, at least one parameter of the mathematical mapping determined by step 904 may be a virtual location associated with the individual. In some examples, the first and second virtual locations may be different websites, may be different virtual places in an extended reality environment, may be different virtual conference calls, and so forth.

In some examples, the first digital data received by step 906 may include an indication of a language associated with the first individual, and the second digital data received by step 914 may include an indication of a language associated with the second individual. Further, the identification of the first mathematical object by step 908 may be based on the language associated with the first individual, and the identification of the second mathematical object by step 916 may be based on the language associated with the second individual. For example, at least one parameter of the mathematical mapping determined by step 904 may be a language associated with the individual. In some examples, the first and second languages may be different natural languages, may be different formal languages, may be different programming languages, may be languages spoken by the respective individuals, may be native languages of the respective individuals, may be second languages of the respective individuals, may be heritage languages of the respective individuals, and so forth.

In some examples, the first digital data received by step 906 may include an indication of a social group associated with the first individual, and the second digital data received by step 914 may include an indication of a social group associated with the second individual. Further, the identification of the first mathematical object by step 908 may be based on the social group associated with the first individual, and the identification of the second mathematical object by step 916 may be based on the social group associated with the second individual. For example, at least one parameter of the mathematical mapping determined by step 904 may be a social group associated with the individual. In some examples, the first and second social groups may be different family groups, may be friendship groups, may be different educational groups, may be different workplace groups, may be different cultural groups, may be different religious groups, may be different recreational groups, may be different online communities, may be different professional organizations, may be different support groups, may be different political groups, may be different generational groups, and so forth.

In some examples, a mathematical object may be used to generate a version of a design of a particular user interface. In one examples, step 910 may comprise using the first mathematical object identified by step 908 to generate a first version of a design of a particular user interface. In another example, step 918 may comprise using the second mathematical object identified by step 916 to generate a second version of the design of the particular user interface of step 910. In some examples, a machine learning model may be used to generate the version of the design of the particular user interface based on the mathematical object. For example, step 910 may use the machine learning model to generate the first version of the design of the particular user interface based on the first mathematical object identified by step 908. In another example, step 918 may use the machine learning model to generate the second version of the design of the particular user interface based on the second mathematical object identified by step 916. The machine learning model may be a machine learning model trained using training examples to generate versions of designs of user interfaces based on mathematical objects and/or additional information. An example of such training example may include a sample mathematical object and/or sample additional information, together with a sample version to a sample design of a sample user interface.

In some examples, the second version of the design of the particular user interface generated by step 918 may differ from the first version of the design of the particular user interface generated by step 910 in at least one visual content. For example, at least one visual content may include a still image, a background image, a product image, a hero image, a logo, a video clip, and so forth. In some examples, the second version of the design of the particular user interface generated by step 918 may differ from the first version of the design of the particular user interface generated by step 910 in at least a layout of elements of the particular user interface. In some examples, the second version of the design of the particular user interface generated by step 918 may differ from the first version of the design of the particular user interface generated by step 910 in at least a distance between two elements of the particular user interface. In some examples, the second version of the design of the particular user interface generated by step 918 may differ from the first version of the design of the particular user interface generated by step 910 in at least a color scheme. In some examples, the second version of the design of the particular user interface generated by step 918 may differ from the first version of the design of the particular user interface generated by step 910 in at least a size of at least one element of the particular user interface. In some examples, the second version of the design of the particular user interface generated by step 9188 may differ from the first version of the design of the particular user interface generated by step 910 in at least a font used to present textual content in the particular user interface. For example, the two versions may differ in at least one of a typeface, a font size, a text style (such as regular, bold, italic, underline, strikethrough, and so forth), a text position (such as subscript, superscript, default, and so forth), letter spacing, line spacing, a text color, a text texture, and so forth.

In some examples, a base version of the design of the particular user interface may be accessed. For example, the base version may be read from memory, may be received from an external device (for example, using digital communication device), may be received from the individual (for example, via a user interface), may be base version 108, may be generated design 160, may be the particular draft generated by step 408 and/or method 400, may be the modified design generated by step 512 and/or method 500, may be based on the layout obtained by step 606 and/or method 600, may be the third version generated by step 716 and/or method 700, may be first version generated by step 806 and/or method 800, and so forth. Further, the base version of the design of the particular user interface and a mathematical object may be used to generate a new version of the design of the particular user interface. For example, the machine learning model may be used with the base version as the additional information and with the mathematical object to generate the new version of the design of the particular user interface. In another example, at least part of the base version of the design may be replaced and/or modified based on the mathematical object to generate the new version of the design of the particular user interface. In one example, step 910 may use the base version of the design of the particular user interface and the first mathematical object to generate the first version of the design of the particular user interface. In another example, step 918 may use the base version of the design of the particular user interface and the second mathematical object to generate the second version of the design of the particular user interface.

In some examples, method 900 may further comprise receiving from a particular individual (for example, a particular individual different than the first and second individuals) a textual input (for example, a textual input in a natural language), for example as described above in relation to step 402. The textual input may be associated with a desire of the particular individual to affect the design of the particular user interface. Further, step 910 may use the textual input and the first mathematical object identified by step 908 to generate the first version of the design of the particular user interface. For example, step 910 may use the machine learning model with the textual input as the additional information and the first mathematical object to generate the first version of the design of the particular user interface. Further, step 918 may use the textual input and the second mathematical object identified by step 916 to generate the second version of the design of the particular user interface. For example, step 918 may use the machine learning model with the textual input as the additional information and the second mathematical object to generate the second version of the design of the particular user interface. In some examples, method 900 may further comprise identifying a third mathematical object in the mathematical space, wherein the third mathematical object may correspond to a word of the textual input, for example using module 302. Further, step 910 may calculate a function of the first mathematical object identified by step 908 and the third mathematical object to obtain a fourth mathematical object in the mathematical space, for example using module 304. Further, step 918 may calculate a function of the second mathematical object and the third mathematical object to obtain a fifth mathematical object in the mathematical space, for example using module 304. Further, step 910 may base the generation of the first version of the design of the particular user interface on the fourth mathematical object, and step 918 may base the generation of the second version of the design of the particular user interface on the fifth mathematical object, for example as described above.

In some examples, method 900 may further comprise receiving from a particular individual (for example, a particular individual different than the first and second individuals) a sketch, for example as described above in relation to step 402. The sketch may be associated with the desire of the particular individual to affect the design of the particular user interface. Further, step 910 may use the sketch and the first mathematical object identified by step 908 to generate the first version of the design of the particular user interface. For example, step 910 may use the machine learning model with the sketch as the additional information and the first mathematical object to generate the first version of the design of the particular user interface. Further, step 918 may use the sketch and the second mathematical object identified by step 916 to generate the second version of the design of the particular user interface. For example, step 918 may use the machine learning model with the sketch as the additional information and the second mathematical object to generate the second version of the design of the particular user interface. In some examples, the sketch may include a plurality of pixel values, and method 900 may further comprise calculating a convolution of at least part of the pixel values of the sketch to obtain a result value. Further, step 910 may calculate a function of the first mathematical object identified by step 908 and the result value to obtain a third mathematical object in the mathematical space, for example using module 304. Further, step 918 may calculate a function of the second mathematical object identified by step 916 and the result value to obtain a fourth mathematical object in the mathematical space, for example using module 304. Further, step 910 may base the generation of the first version of the design of the particular user interface on the third mathematical object, and step 918 may be the generation of the second version of the design of the particular user interface on the fourth mathematical object, for example as described above.

What is claimed is:

1. A non-transitory computer readable medium storing a software program comprising data and computer implementable instructions that when executed by at least one processor cause the at least one processor to perform operations for learning to personalize user interfaces, the operations comprising:

accessing a plurality of historic digital experience records, each historic digital experience record of the plurality of historic digital experience records is associated with an historic digital experience of a respective individual with a respective user interface and associates a characteristic of the respective individual with a design of the respective user interface and an indication of a respective level of success;

analyzing the plurality of historic digital experience records to determine a mathematical mapping of individuals to a mathematical space;

receiving first digital data associated with a first individual, the first individual is not associated with any one of the plurality of historic digital experience records;

analyzing the first digital data using the mathematical mapping to identify a first mathematical object in the mathematical space;

using the first mathematical object to generate a first version of a design of a particular user interface;

transmitting first digital signals to a first computing device associated with the first individual, the first digital signals are configured to cause the first computing device to present the particular user interface based on the first version of the design of the particular user interface;

receiving second digital data associated with a second individual, the second individual is not associated with any one of the plurality of historic digital experience records;

analyzing the second digital data using the mathematical mapping to identify a second mathematical object in the mathematical space;

using the second mathematical object to generate a second version of the design of the particular user interface; and transmitting second digital signals to a second computing device associated with the second individual, the second digital signals are configured to cause the second computing device to present the particular user interface based on the second version of the design of the particular user interface.

2. The non-transitory computer readable medium of claim 1, wherein the operations further comprise:

accessing a base version of the design of the particular user interface;

using the base version of the design of the particular user interface and the first mathematical object to generate the first version of the design of the particular user interface; and using the base version of the design of the particular user interface and the second mathematical object to generate the second version of the design of the particular user interface.

3. The non-transitory computer readable medium of claim 1, wherein the operations further comprise:

receiving first textual data, the first textual data includes a description in the natural language of at least one characteristic of the first individual;

analyzing the first textual data to determine the first digital data, the first digital data is based on the at least one characteristic of the first individual;

receiving second textual data, the second textual data includes a description in the natural language of at least one characteristic of the second individual; and analyzing the second textual data to determine the second digital data, the second digital data is based on the at least one characteristic of the second individual.

4. The non-transitory computer readable medium of claim 1, wherein the operations further comprise:

determining that the first individual is associated with a first population segment;

determining that the second individual is associated with a second population segment, the second population segment differs from the first population segment;

accessing a data-structure associating population segments with digital records based on the first population segment to obtain the first digital data; and accessing the data-structure based on the second population segment to obtain the second digital data.

5. The non-transitory computer readable medium of claim 1, wherein the first digital data includes an indication of a first physical location associated with the first individual, the second digital data includes an indication of a second physical location associated with the second individual, the identification of the first mathematical object is based on the first physical location associated with the first individual, and the identification of the second mathematical object is based on the second physical location associated with the second individual.

6. The non-transitory computer readable medium of claim 1, wherein the first digital data includes an indication of a demographic characteristic of the first individual, the second digital data includes an indication of a demographic characteristic of the second individual, the identification of the first mathematical object is based on the demographic characteristic of the first individual, and the identification of the second mathematical object is based on the demographic characteristic of the second individual.

7. The non-transitory computer readable medium of claim 1, wherein the first digital data includes an indication of a behavior pattern associated with the first individual, the second digital data includes an indication of a behavior pattern associated with the second individual, the identification of the first mathematical object is based on the behavior pattern associated with the first individual, and the identification of the second mathematical object is based on the behavior pattern associated with the second individual.

8. The non-transitory computer readable medium of claim 1, wherein the first digital data includes an indication of a virtual location associated with the first individual, the second digital data includes an indication of a virtual location associated with the second individual, the identification of the first mathematical object is based on the virtual location associated with the first individual, and the identification of the second mathematical object is based on the virtual location associated with the second individual.

9. The non-transitory computer readable medium of claim 1, wherein the first digital data includes an indication of a social group associated with the first individual, the second digital data includes an indication of a social group associated with the second individual, the identification of the first mathematical object is based on the social group associated with the first individual, and the identification of the second mathematical object is based on the social group associated with the second individual.

10. The non-transitory computer readable medium of claim 1, wherein the second version of the design of the particular user interface differs from the first version of the design of the particular user interface in at least a layout of elements of the particular user interface.

11. The non-transitory computer readable medium of claim 1, wherein the second version of the design of the particular user interface differs from the first version of the design of the particular user interface in at least a color scheme.

12. The non-transitory computer readable medium of claim 1, wherein the second version of the design of the particular user interface differs from the first version of the design of the particular user interface in at least a font used to present textual content in the particular user interface.

13. The non-transitory computer readable medium of claim 1, wherein the operations further comprise:

receiving from a particular individual a textual input in a natural language, the textual input is indicative of a trait of individuals; and analyzing the textual input and the plurality of historic digital experience records to determine the mathematical mapping.

14. The non-transitory computer readable medium of claim 1, wherein the operations further comprise:

receiving from a particular individual a textual input in a natural language, the textual input is associated with a desire of the particular individual to affect the design of the particular user interface;

using the textual input and the first mathematical object to generate the first version of the design of the particular user interface; and using the textual input and the second mathematical object to generate the second version of the design of the particular user interface.

15. The non-transitory computer readable medium of claim 1, wherein the operations further comprise: identifying a third mathematical object in a mathematical space, the third mathematical object corresponds to a word of the textual input; calculating a function of the first mathematical object and the third mathematical object to obtain a fourth mathematical object in the mathematical space; basing the generation of the first version of the design of the particular user interface on the fourth mathematical object; calculating a function of the second mathematical object and the third mathematical object to obtain a fifth mathematical object in the mathematical space; and basing the generation of the second version of the design of the particular user interface on the fifth mathematical object.

16. The non-transitory computer readable medium of claim 1, wherein the operations further comprise:
receiving from a particular individual a sketch, the sketch is associated with the desire of the particular individual to affect the design of the particular user interface;
using the sketch and the first mathematical object to generate the first version of the design of the particular user interface; and
using the sketch and the second mathematical object to generate the second version of the design of the particular user interface.

17. The non-transitory computer readable medium of claim 1, wherein the sketch includes a plurality of pixel values, and the operations further comprise: calculating a convolution of at least part of the pixel values of the sketch to obtain a result value; calculating a function of the first mathematical object and the result value to obtain a third mathematical object in a mathematical space; basing the generation of the first version of the design of the particular user interface on the third mathematical object; calculating a function of the second mathematical object and the result value to obtain a fourth mathematical object in the mathematical space; and basing the generation of the second version of the design of the particular user interface on the fourth mathematical object.

18. The non-transitory computer readable medium of claim 1, wherein the analyzing the plurality of historic digital experience records to determine the mathematical mapping includes using an optimization scheme with an objective function based on the levels of success to determine the mathematical mapping.

19. A system for learning to personalize user interfaces, the system comprising at least one processing unit configured to perform operations, the operations comprise:
accessing a plurality of historic digital experience records, each historic digital experience record of the plurality of historic digital experience records is associated with an historic digital experience of a respective individual with a respective user interface and associates a characteristic of the respective individual with a design of the respective user interface and an indication of a respective level of success;
analyzing the plurality of historic digital experience records to determine a mathematical mapping of individuals to a mathematical space;
receiving first digital data associated with a first individual, the first individual is not associated with any one of the plurality of historic digital experience records;
analyzing the first digital data using the mathematical mapping to identify a first mathematical object in the mathematical space;
using the first mathematical object to generate a first version of a design of a particular user interface;
transmitting first digital signals to a first computing device associated with the first individual, the first digital signals are configured to cause the first computing device to present the particular user interface based on the first version of the design of the particular user interface;
receiving second digital data associated with a second individual, the second individual is not associated with any one of the plurality of historic digital experience records;
analyzing the second digital data using the mathematical mapping to identify a second mathematical object in the mathematical space;
using the second mathematical object to generate a second version of the design of the particular user interface; and
transmitting second digital signals to a second computing device associated with the second individual, the second digital signals are configured to cause the second computing device to present the particular user interface based on the second version of the design of the particular user interface.

20. A method for learning to personalize user interfaces, the method comprising:
accessing a plurality of historic digital experience records, each historic digital experience record of the plurality of historic digital experience records is associated with an historic digital experience of a respective individual with a respective user interface and associates a characteristic of the respective individual with a design of the respective user interface and an indication of a respective level of success;
analyzing the plurality of historic digital experience records to determine a mathematical mapping of individuals to a mathematical space;
receiving first digital data associated with a first individual, the first individual is not associated with any one of the plurality of historic digital experience records;
analyzing the first digital data using the mathematical mapping to identify a first mathematical object in the mathematical space;
using the first mathematical object to generate a first version of a design of a particular user interface;
transmitting first digital signals to a first computing device associated with the first individual, the first digital signals are configured to cause the first computing device to present the particular user interface based on the first version of the design of the particular user interface;
receiving second digital data associated with a second individual, the second individual is not associated with any one of the plurality of historic digital experience records;
analyzing the second digital data using the mathematical mapping to identify a second mathematical object in the mathematical space;
using the second mathematical object to generate a second version of the design of the particular user interface; and
transmitting second digital signals to a second computing device associated with the second individual, the second digital signals are configured to cause the second computing device to present the particular user interface based on the second version of the design of the particular user interface.

* * * * *